(12) United States Patent
Wada et al.

(10) Patent No.: US 6,549,346 B2
(45) Date of Patent: Apr. 15, 2003

(54) ASSEMBLED LENS, OPTICAL HEAD AND OPTICAL RECORDABLE PLAYER WITH THEM

(75) Inventors: Hidenori Wada, Uji (JP); Keiichi Matsuzaki, Ikeda (JP); Seiji Nishino, Osaka (JP); Tetsuo Saimi, Hirakata (JP); Kenichi Kasazumi, Takatsuki (JP); Masanari Mohri, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/982,278

(22) Filed: Oct. 17, 2001

(65) Prior Publication Data

US 2002/0071190 A1 Jun. 13, 2002

(30) Foreign Application Priority Data

Oct. 17, 2000 (JP) ........................................ 2000-316151

(51) Int. Cl.$^7$ ................................................. G02B 7/02
(52) U.S. Cl. ....................................... 359/814; 359/824
(58) Field of Search ............................... 359/813, 814, 359/819, 822, 823, 824, 717, 719; 369/44.12, 44.13, 44.14, 44.15, 44.16

(56) References Cited

U.S. PATENT DOCUMENTS

| | | | | |
|---|---|---|---|---|
| 6,055,113 A | * | 4/2000 | Yamamoto et al. | ......... 359/661 |
| 6,115,347 A | * | 9/2000 | Ichimura et al. | ....... 369/112.24 |
| 6,307,687 B1 | * | 10/2001 | Nishikawa | ................... 359/814 |
| 6,392,819 B1 | * | 5/2002 | Harada | ....................... 359/719 |
| 6,411,585 B1 | * | 6/2002 | Kobayashi | ............. 369/112.01 |

FOREIGN PATENT DOCUMENTS

| | | |
|---|---|---|
| JP | 11-203706 | 7/1999 |
| JP | 2000-090473 | 3/2000 |

* cited by examiner

*Primary Examiner*—Huy Mai
*Assistant Examiner*—Saeed Seyrafi
(74) *Attorney, Agent, or Firm*—Snell & Wilmer, LLP

(57) ABSTRACT

An objective lens assembly includes: at least two groups of lenses having a common optical axis: and at least two lens holders for respectively holding the at least two groups of lenses, wherein each of the lens holders has an end face perpendicular to the optical axis, and the lens holders are positioned such that the end face of one of the lens holders faces the end face of the other lens holder, and a gap between these end faces is filled with an adhesive agent for adhering the lens holders to each other.

34 Claims, 14 Drawing Sheets

FIG. 2
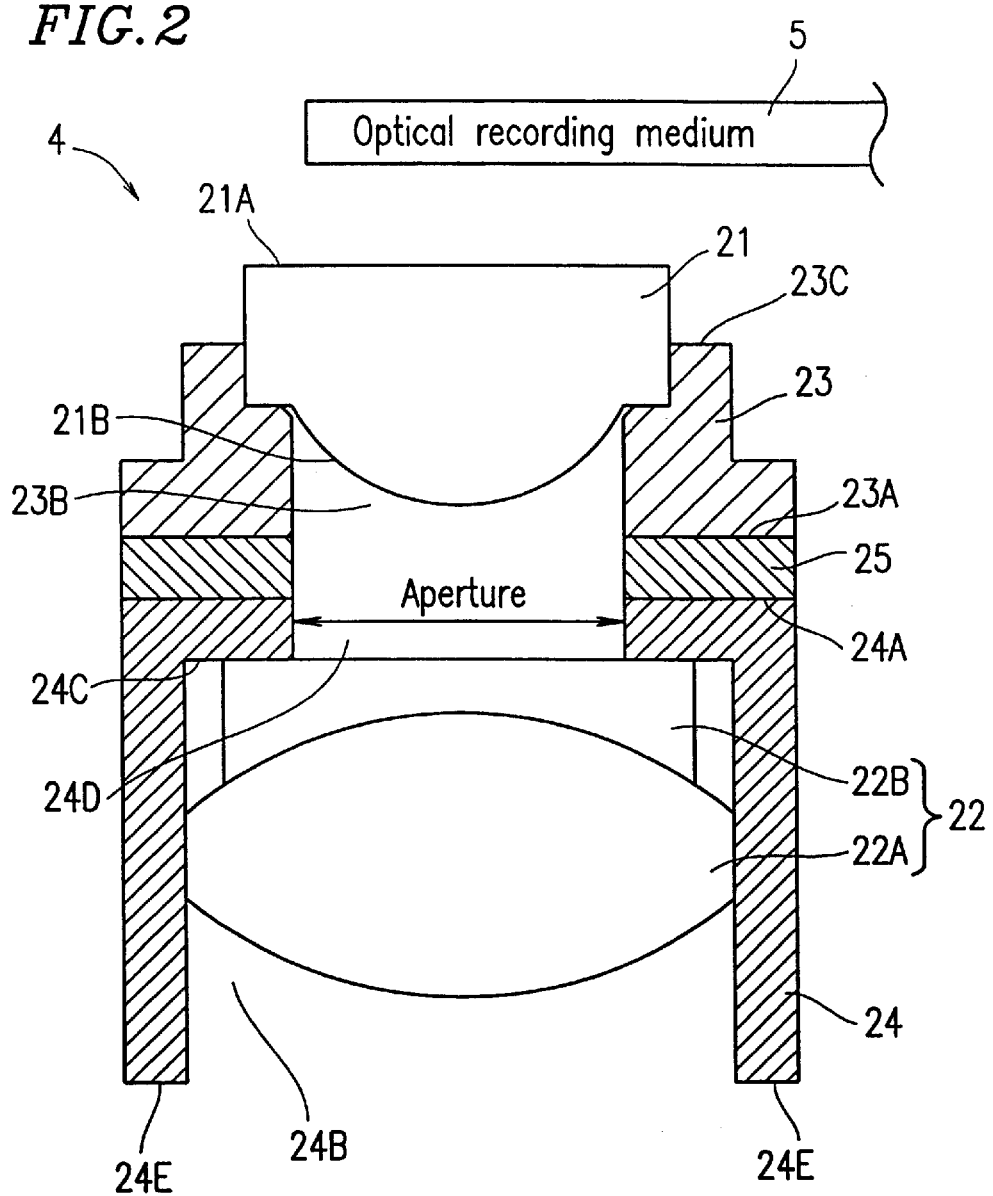
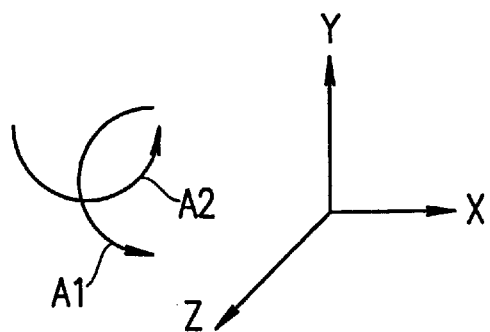

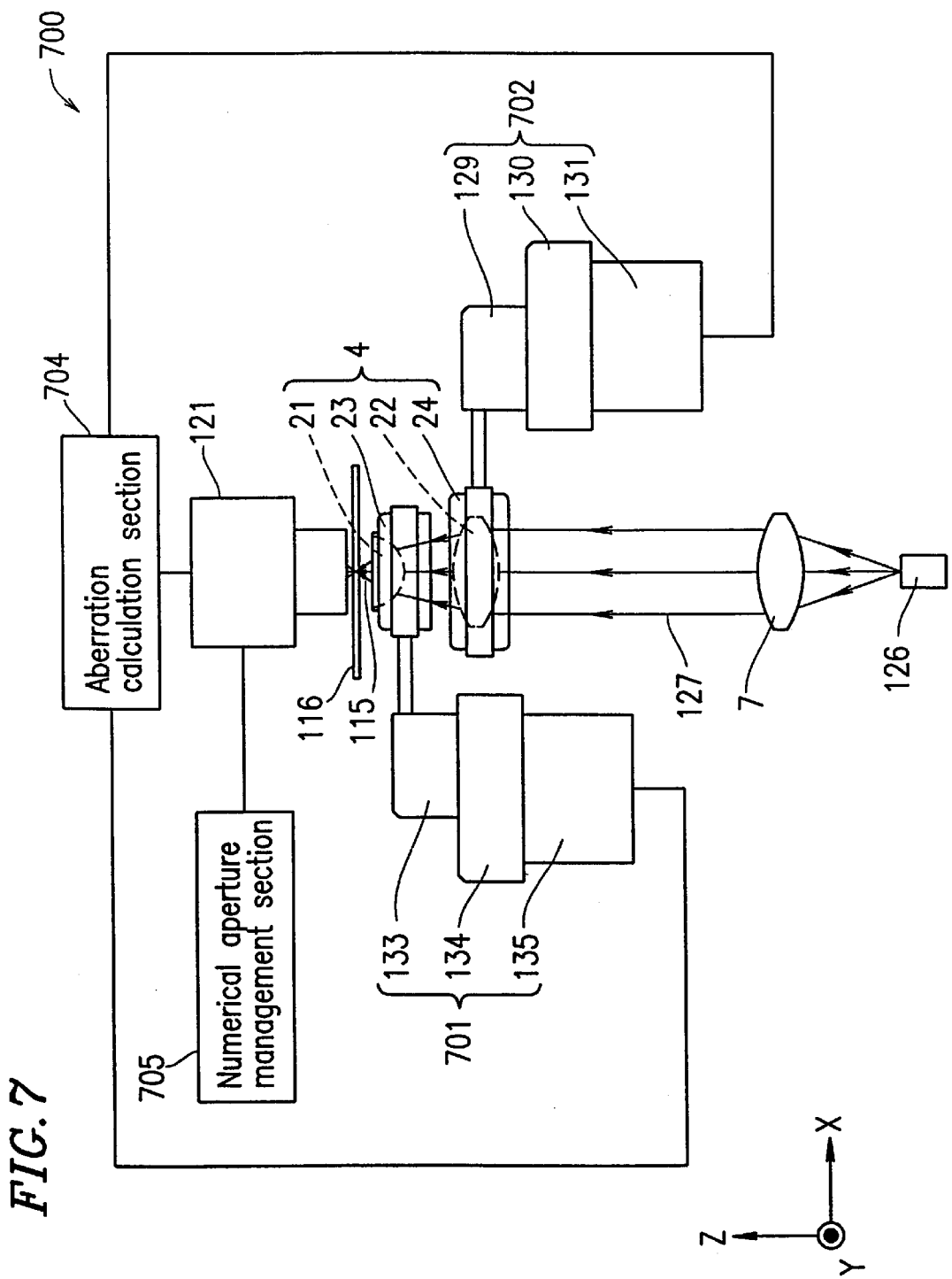

FIG.12
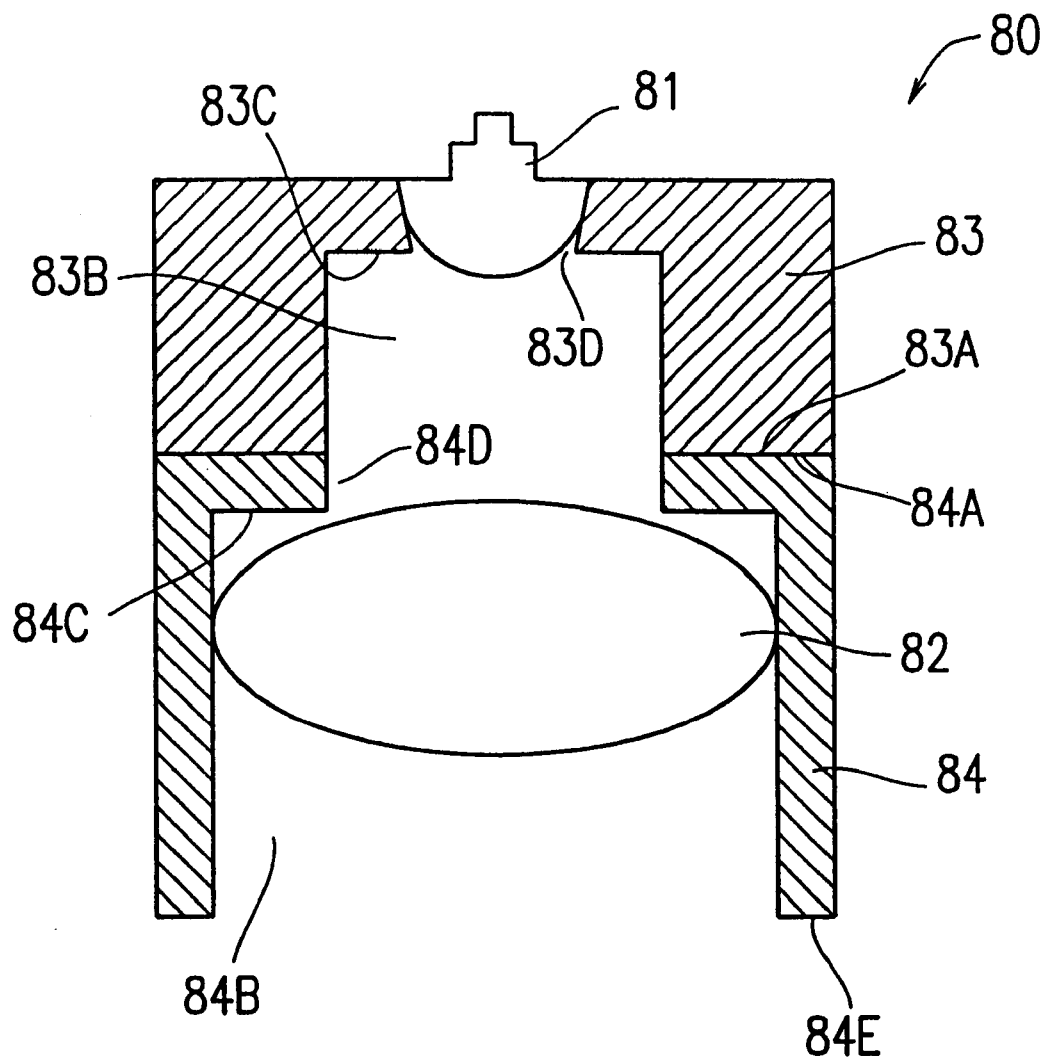
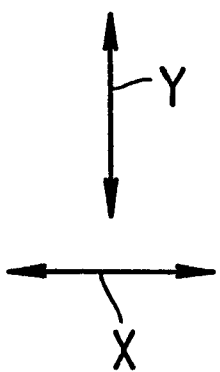

ASSEMBLED LENS, OPTICAL HEAD AND OPTICAL RECORDABLE PLAYER WITH THEM

BACKGROUND OF THE INVENTION

1. Field of the Invention

The present invention relates to an objective lens assembly, and to an optical head and an optical recording/reproduction apparatus using the objective lens assembly. Specifically, the present invention relates to an objective lens assembly having a high numerical aperture (NA) which is used for optical information processing, optical transmission, etc., and to an optical head and an optical recording/reproduction apparatus using such an objective lens assembly.

2. Description of the Related Art

In recent years, a digital versatile disc (DVD) has been receiving attention as a large storage optical medium because of its high recording density for recording digital information, which is six times higher than that of a compact disc (CD). Along with the increase of information to be stored, an optical recording medium which has a greater recording density than the DVD has been demanded. In order to achieve a higher recording density than the conventional DVD (wavelength: 660 nm, numerical aperture (NA): 0.6), it is necessary to shorten the wavelength of a light source and increase the NA of an objective lens assembly. For example, when using a blue laser which operates at a wavelength of 405 nm as a light source and an objective lens having a NA of 0.85, a recording density achieved is five times greater than that of the above DVD.

Such a high numerical aperture cannot be achieved by a single lens. Thus, an objective lens assembly structured by assembling a plurality of lenses is used in order to obtain a high numerical aperture. However, variations which may occur in the production of respective component lenses of the lens assembly cause aberrations. In order to correct such aberrations, there are various techniques proposed.

Japanese Laid-Open Publication No. 11-203706 proposes a technique for adjusting the relative positions of respective component lenses by moving the component lenses in order to correct aberration. FIG. 12 shows a structure of a conventional objective lens assembly 80 described in Japanese Laid-Open Publication No. 11-203706. The objective lens assembly 80 includes a first lens 81, a second lens 82, a first lens holder 83 for holding the first lens 81, and a second lens holder 84 for holding the second lens 82. The first lens holder 83 has the shape of a hollow cylinder. The first lens holder 83 has an end face 83A which faces the second lens holder 84. In the end face 83A, a cylindrical opening 83B is formed. At a central portion of a bottom face 83C of the opening 83B, the first lens holder 83 has a hole 83D for holding the first lens 81. The first lens 81 is fit into the hole 83D such that the optical axis thereof is generally perpendicular to the end face 83A. The second lens holder 84 also has the shape of a hollow cylinder. The second lens holder 84 has an end face 84A which faces the end face 83A of the first lens holder 83 and an end face 84E which is opposite to the end face 84A. In the end face 84E, the second lens holder 84 has a cylindrical opening 84B whose diameter is larger than that of the opening 83B. At a central portion of a bottom face 84C of the opening 84B, the second lens holder 84 has a hole 84D which has substantially the same diameter as that of the opening 83B of the first lens holder 83. The second lens 82 is retained in the opening 84B such that the optical axis thereof is generally perpendicular to the end face 84A.

In the objective lens assembly 80 having such a structure, in order to correct aberrations which may be caused by variations in production, relative positions of the first lens 81 and the second lens 82 are adjusted. Specifically, the relative position of the second lens 82 with respect to the first lens 81 is adjusted by adjusting the relative position of the second lens holder 84 with respect to the first lens holder 83 along the direction indicated by arrow X such that the optical axis of the second lens 82 coincides with the optical axis of the first lens 81. Then, the second lens 82 which is retained by a spring (not shown) is moved along the direction indicated by arrow Y by turning a screw (not shown), whereby the relative position of the second lens 82 with respect to the first lens 81 along the direction indicated by arrow Y is adjusted. Thereafter, the first lens holder 83 and the second lens holder 84 are adhered to each other such that the end face 83A faces the end face 84A. In this way, the relative position of the second lens 82 with respect to the first lens 81 is adjusted such that aberration of each component lens is corrected. As a result, an objective lens assembly having a high NA can be obtained.

Japanese Laid-Open Publication No. 2000-90473 proposes a structure where component lenses are incorporated into lens holders without strictly adjusting the relative positions of the component lenses, and one of the incorporated lenses is polished so as to correct aberration. FIG. 13 shows a structure of a conventional objective lens assembly 90 described in Japanese Laid-Open Publication No. 2000-90473. The objective lens assembly 90 includes a first lens 91, a second lens 92 integrally formed from a plurality of single-lenses, and a lens holder 93 for holding the first lens 91 and the second lens 92. The lens holder 93 has the shape of a hollow cylinder and has end faces 93A and 93B. The lens holder 93 has an opening 93C which penetrates through the end faces 93A and 93B and which has steps inside thereof. The first lens 91 is held in the opening 93C at the end face 93A. The second lens 92 is held inside of the opening 93C. The first lens 91 has an end face 91A on the opposite side from the second lens 92 in relation to the first lens 91.

The manner in which the objective lens assembly 90 having such a structure is assembled is described. In the first step, the first lens 91 and the second lens 92 are incorporated in the lens holder 93 without strictly adjusting the relative positions of these lenses. Next, the end face 91A of the first lens 91 is polished such that a total aberration of the first lens 91 and the second lens 92 is reduced, thereby completing the objective lens assembly 90. Specifically, aberrations caused due to variations in production of each of the first lens 91 and the second lens 92 and aberrations caused due to variations which may occur when incorporating the first lens 91 and the second lens 92 in the lens holder 93 are corrected by generating aberration by polishing the end face 91A of the first lens 91. Thus, when an objective lens assembly is assembled by using this method, a wider production tolerance for each lens component and a wider incorporation tolerance for incorporation into a lens holder can be provided.

Japanese Laid-Open Publication No. 11-174307 proposes an objective lens assembly where two lens holders each incorporating a lens are combined such that one is fit into the other, and the interval between these two lenses can be adjusted.

In adjustment of an objective lens assembly including two lens holders, one of the lens holders is moved with respect to the other such that the relative positions of these two lenses are changed. In this case, it is desirable to move one of the lens holders along five axes (lens interval direction, two directions for lens tilt, and two directions for adjusting the center of the lens), such that the total aberration of the entire objective lens assembly is minimized. One of the known methods for measuring aberration is a method using a Twyman interferometer. A conventional adjustment method for adjusting the relative positions of the two lens holders while measuring the aberration with the Twyman interferometer is described with reference to FIG. 14.

FIG. 14 shows a structure of a conventional objective lens assembling/adjusting apparatus 1400. Light is supplied to a half mirror 101 in the direction indicated by arrow 145 in order to measure the total aberration of an entire objective lens assembly. Some components of the supplied light are reflected by the half mirror 101, and the other components of the supplied light reach a second lens 22 of an objective lens assembly 144 which are measured. Some components of the light reflected by the half mirror 101 are further reflected by a reflection mirror 112 and are transmitted through the half mirror 101 so as to reach a detection panel 111. On the other hand, the other components of the supplied light which have reached the second lens 22 of the objective lens assembly 144 are transmitted through a first lens 21 of the objective lens assembly 144 so as to enter a reference sphere 106. The reference sphere 106 is positioned such that the center of the reference sphere 106 coincides with a focal point 107 of the objective lens assembly 144. Light concentrated on the focal point 107 crosses the surface of the reference sphere 106 at right angles. The light entering into the reference sphere 106 toward the focal point 107 is reflected by the surface of the reference sphere 106 and returns via the same route. This reflected light is further reflected by the half mirror 101 so as to be incident on the detection panel 111.

The light reflected by the reflection mirror 112 and the light reflected by the reference sphere 106 generate an interference pattern 113 on the detection panel 111. Based on this interference pattern 113, the aberration which may be caused by a combination of the first lens 21 and the second lens 22 can be measured.

In the structure described in Japanese Laid-Open Publication No. 11-203706 shown in FIG. 12, a screw is used to adjust the relative position of the second lens 82 with respect to the first lens 81 along the direction indicated by arrow Y. This is not suitable for mass production of objective lens assemblies.

In the structure described in Japanese Laid-Open Publication No. 2000-90473 shown in FIG. 13, it is necessary to polish the end face 91A of the first lens 91 so as to obtain a desired surface shape. Such a polishing process is not suitable for mass production of objective lens assemblies.

In the structure described in Japanese Laid-Open Publication No. 11-174307, since the positions of the lenses are adjusted while one of the two lens holders fits into the other, adjustments of decentering and tilting are limited. In this structure, among various aberrations of each lens which may be caused by variations in production, only spherical aberration can be corrected, but comatic aberration and astigmatism cannot be corrected.

In such a case, a relative position (decenter or tilt) of each lens is adjusted before it is incorporated into a lens holder, and such an adjusted lens is adhered to a lens holder, whereby every aberration can be corrected. In this case, however, it is necessary to strongly adhesively fix the lens to the lens holder.

Such a strong adherence results in a stress being applied to each lens. Furthermore, when an adhesive agent is applied to a curved lens surface, the amount of the adhesive agent between the lens and the lens holder becomes non-uniform. In such a case, if the temperature is increased, the relative positions of the lens and the lens holder significantly changes, and as a result, the temperature characteristic of the objective lens assembly is deteriorated. This problem may be caused not only when first and second lenses whose relative positions are adjusted are respectively adhered to first and second lens holders, but also when the first and second lenses whose relative positions are adjusted are adhered to a single lens holder.

Furthermore, in the structure of the conventional objective lens assembling/adjusting apparatus 1400 in FIG. 14, when the relative positions of the first lens 21 and the second lens 22 are changed, the position of the focal point 107 is also changed. Thus, it is necessary to move the reference sphere 106 according to the change in position of the focal point 107 such that the center of the reference sphere 106 coincides with the focal point 107. Moreover, there are three directions (X-axis direction, Y-axis direction, and Z-axis direction) in which the reference sphere 106 is to be moved. Therefore, it is necessary to detect offset information as to the positional offset between the center of the reference sphere 106 and the focal point 107 for each of the three directions, and it is necessary to move the reference sphere 106 based on a detection result such that the center of the reference sphere 106 coincides with the focal point 107. Such a complicated procedure increases the number of steps in assembling an objective lens assembly, and the increase in the number of assembly steps becomes an obstacle to the mass production of objective lens assemblies.

When measuring aberration by such an interferometer based on the change of the two-beam interference pattern 113, the flow of air between the objective lens assembly 144 and the reference sphere 106 is turbulent, and such turbulence of an air layer causes waves in the interference pattern 113. When waves in the interference pattern 113 are caused, the aberration of the objective lens assembly cannot be measured with high accuracy, and therefore, the objective lens assembly cannot be assembled with high accuracy.

SUMMARY OF THE INVENTION

According to one aspect of the present invention, an objective lens assembly includes: at least two groups of lenses having a common optical axis; and at least two lens holders for respectively holding the at least two groups of lenses, wherein each of the lens holders has an end face perpendicular to the optical axis, and the lens holders are positioned such that the end face of one of the lens holders faces the end face of the other lens holder, and a gap between these end faces is filled with an adhesive agent for adhering the lens holders to each other.

In one embodiment of the present invention, a numerical aperture (NA) of the objective lens assembly is 0.7 or more.

In another embodiment of the present invention, chromatic aberration of the objective lens assembly for light having a wave length from 390 nm to 450 nm is corrected.

In still another embodiment of the present invention, one of the at least two lens holders is adjusted with respect to at least another one of the at least two lens holders along at least five directions including a direction parallel to the optical axis, two directions perpendicular to the optical axis, and two tilt directions, and thereafter is adhered by the adhesive agent to the at least another one of the at least two lens holders.

In still another embodiment of the present invention, one of the at least two lens holders is adjusted with respect to at least another one of the at least two lens holders along at least five directions including a direction parallel to the optical axis, two directions perpendicular to the optical axis, and two tilt directions, such that aberration of the objective lens assembly is equal to or smaller than a predetermined value.

In still another embodiment of the present invention, the predetermined value of the aberration of the objective lens assembly is about 70 mλ.

In still another embodiment of the present invention, a shape of at least one of the at least two lens holders is different from those of the other lens holders of the at least two lens holders.

In still another embodiment of the present invention, all of the at least two lens holders have the same shape.

In still another embodiment of the present invention, the at least two lens holders are all formed of the same material.

In still another embodiment of the present invention, a material used for forming at least one of the at least two lens holders is different from that used for forming the other lens holders of the at least two lens holders.

In still another embodiment of the present invention, at least one of the at least two lens holders has a mirror face at a position opposite to the end face thereof.

In still another embodiment of the present invention, the mirror face is formed by plating or vapor deposition.

In still another embodiment of the present invention, at least one of the at least two lens holders has an aperture formed therein for determining a size of the numerical aperture (NA) of the objective lens assembly.

In still another embodiment of the present invention, the lens holder is blackened or made of a transparent material such that reflectance inside the lens holder is reduced.

In still another embodiment of the present invention, a group of lenses among the at least two groups of lenses are contained inside the lens holder for holding the group of lenses.

In still another embodiment of the present invention, at least one group of the at least two groups of lenses partially protrudes from at least one of the at least two lens holders for holding the at least two groups of lenses.

In still another embodiment of the present invention, a material for forming the at least two lens holders is a metal.

In still another embodiment of the present invention, a material for forming the at least two lens holders is a resin.

Instill another embodiment of the present invention, the thermal expansion coefficient of the resin is isotropic.

In still another embodiment of the present invention, at least one group among the at least two groups of lenses and at least one of the at least two lens holders for holding the one group among the at least two groups of lenses are integrally formed.

According to another aspect of the present invention, an objective lens assembly includes: at least two groups of lenses having a common optical axis; and at least two lens holders for respectively holding the at least two groups of lenses, wherein at least one of the at least two lens holders has an engagement portion for engaging with an actuator which drives the objective lens assembly such that the position of the objective lens assembly is controlled.

In one embodiment of the present invention, each of the lens holders has an end face perpendicular to the optical axis; and the lens holders are positioned such that the end face of one of the lens holders faces the end face of another lens holder, and a gap between these end faces is filled with an adhesive agent for adhering the lens holders to each other.

In another embodiment of the present invention, the engagement portion is provided at a position corresponding to a plane which includes the centroid of the objective lens assembly and is vertical to the optical axis.

According to still another aspect of the present invention, an apparatus for assembling/adjusting an objective lens assembly of claim 5 includes: a light source for emitting light toward the objective lens assembly; a diffraction grating for generating interference fringes based on the light transmitted through the objective lens assembly; an aberration calculation section for calculating aberration of the objective lens assembly based on the interference fringes; and a driving section for driving one of the at least two lens holders to move with respect to another one of the lens holders along at least five directions including a direction parallel to the optical axis, two directions perpendicular to the optical axis, and two tilt directions, such that the aberration of the objective lens assembly which is calculated by the aberration calculation section is equal to or smaller than the predetermined value.

In one embodiment of the present invention, the diffraction grating is formed on a glass substrate; and the thickness of the glass substrate is determined such that the glass substrate has an aberration equal to that of an optical recording medium on which an optical recording/reproduction apparatus incorporating a completed objective lens assembly performs recording and/or reproduction.

In another embodiment of the present invention, the diffraction grating separates the light transmitted through the objective lens assembly into +1st-order diffraction light, −1st-order diffraction light, and transmitted light; and the apparatus for assembling/adjusting an objective lens assembly further includes a numerical aperture management section for managing the size of aperture for determining the size of a numerical aperture of the objective lens assembly based on a positional relationship between a first overlapping area of the +1st-order diffraction light and the transmitted light and a second overlapping area of the −1st-order diffraction light and the transmitted light.

According to still another aspect of the present invention, an optical head for recording or reproducing a signal on an optical recording medium includes: a light source; and the objective lens assembly of claim 1 located between the light source and the optical recording medium.

In one embodiment of the present invention, the optical head further includes an actuator which includes a movable member coupled to the optical lens assembly, a movable member holding section for holding the movable member, and a movable member driving section coupled to the movable member holding section for driving the movable member, wherein the movable member included in the actuator and the at least two lens holders are formed of the same material.

In another embodiment of the present invention, the optical head further includes an actuator which includes a movable member coupled to the optical lens assembly, a movable member holding section for holding the movable member, and a movable member driving section coupled to the movable member holding section for driving the movable member, wherein the movable member included in the actuator functions as at least one of the at least two lens holders.

According to still another aspect of the present invention, an optical head for recording or reproducing a signal on an optical recording medium includes: a light source; and the objective lens assembly of claim 21 located between the light source and the optical recording medium.

In one embodiment of the present invention, the optical head further includes an actuator which includes a movable member coupled to the optical lens assembly, a movable member holding section for holding the movable member, and a movable member driving section coupled to the movable member holding section for driving the movable member, wherein the engagement portion of one of the at least two lens holders engages with the movable member included in the actuator.

In another embodiment of the present invention, the engagement portion is provided such that the centroid of the objective lens assembly coincides with a center of driving of the actuator.

According to still another aspect of the present invention, an optical recording/reproduction apparatus for recording or reproducing a signal on an optical recording medium includes: a motor for rotating the optical recording medium; the optical head of claim 27; and a processing circuit for controlling the motor and the optical head.

According to still another aspect of the present invention, an optical recording/reproduction apparatus for recording or reproducing a signal on an optical recording medium includes: a motor for rotating the optical recording medium; the optical head of claim 30; and a processing circuit for controlling the motor and the optical head.

Thus, the invention described herein makes possible the advantages of (1) providing an objective lens assembly where aberration of each component lens which may be caused due to variations in the production thereof can be corrected by a method suitable for mass production of the objective lens assembly, and an optical head and an optical recording/reproduction apparatus using such an objective lens assembly, (2) providing an objective lens assembly having a superior temperature characteristic, and an optical head and an optical recording/reproduction apparatus using such an objective lens assembly, and (3) providing an objective lens assembly where aberration of each component lens which may be caused due to variations in the production thereof can be corrected with high accuracy, and an optical head and an optical recording/reproduction apparatus using such an objective lens assembly.

These and other advantages of the present invention will become apparent to those skilled in the art upon reading and understanding the following detailed description with reference to the accompanying figures.

BRIEF DESCRIPTION OF THE DRAWINGS

FIG. 2 shows a structure of an objective lens assembly according to embodiment 1 of the present invention.

FIG. 7 shows a structure of an objective lens assembling/adjusting apparatus according to embodiment 3 of the present invention.

FIG. 12 shows an exemplary structure of a conventional lens assembly.

DESCRIPTION OF THE PREFERRED EMBODIMENTS

Hereinafter, embodiments of the present invention will be described with reference to the drawings.

Embodiment 1

Figure 1:
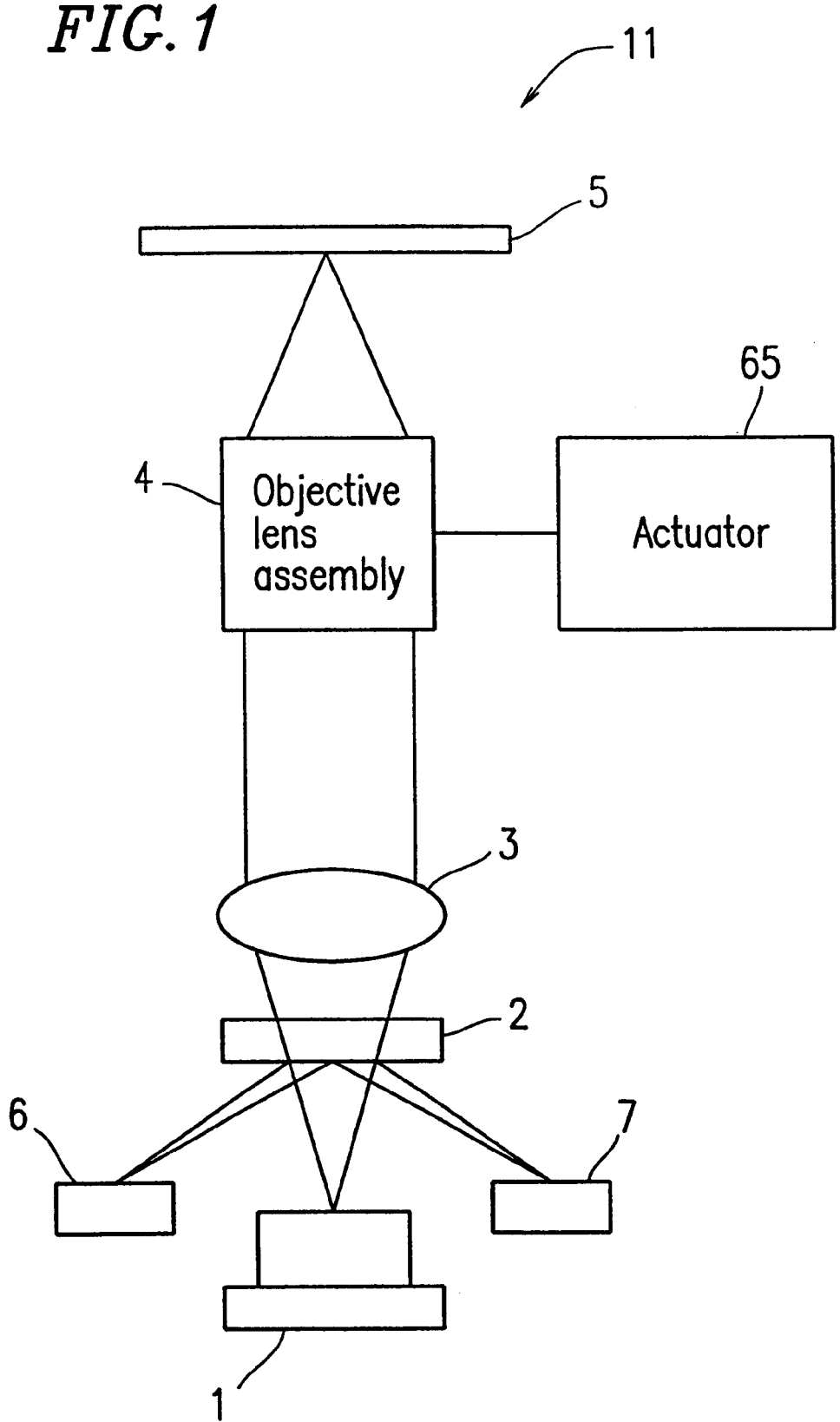
FIG. 1 is a schematic view showing a structure of an optical head according to embodiment 1 of the present invention.

In embodiment 1, an example of an optical head according to the present invention is described. FIG. 1 is a schematic view showing a structure of an optical head 11 according to embodiment 1. The optical head 11 includes an objective lens assembly where aberration of each component lens can be corrected by a method suitable for mass production of the objective lens assembly. In FIG. 1, the optical head 11 includes a light source 1, a diffraction grating 2, a collimator lens 3, an objective lens assembly 4, a first optical detector 6, a second optical detector 7, and an actuator 65. The collimator lens 3 and the objective lens assembly 4 form a light concentrating optical system.

The light source 1 is, for example, a semiconductor laser device which emits coherent light for recording/reproduction toward a recording layer of an optical recording medium 5. The diffraction grating 2 is formed by patterning a desired pattern on a glass surface using photolithography and etching the desired pattern. The diffraction grating 2 has such characteristics that the zeroth-order diffraction efficiency is about 50%, and the ±1st-order diffraction efficiency is about 50%. The collimator lens 3 converts coherent light emitted by the light source 1 and transmitted through the diffraction grating 2 into parallel light. The objective lens assembly 4 concentrates light on the recording layer of the optical recording medium 5. Details thereof are described later in detail. Among the light reflected by the recording layer of the optical recording-medium 5, +1st-order light diffracted by the diffraction grating 2 is received and converted by the first optical detector 6 into an electrical signal, and −1st-order light diffracted by the diffraction grating 2 is received and converted by the second optical detector 7 into an electrical signal. The actuator 65 drives the objective lens assembly 4 in such a manner that the position of the objective lens assembly 4 is controlled based on the electrical signal generated by the first optical detector 6.

An operation of the optical head 11 having such a structure is described. Some components of coherent light emitted by the light source 1 are transmitted through the diffraction grating 2 so as to enter the collimator lens 3, and is then converted by the collimator lens 3 into parallel light. This parallel light is concentrated by the objective lens assembly 4 on the optical recording medium 5. The light reflected by the optical recording medium 5 is transmitted through the objective lens assembly 4 and the collimator lens 3 again, and diffracted by the diffraction grating 2. The diffracted +1st-order light enters the first optical detector 6, and the diffracted −1st-order light enters the second optical detector 7.

The first optical detector 6 outputs, based on the +1st-order light from the diffraction grating 2, a focus error signal which indicates the focusing state of the light on the optical recording medium 5 and a tracking error signal which indicates a position on the optical recording medium 5 which is irradiated with the light. The focus error signal is supplied to a focus control section (not shown). Based on the focus error signal, the focus control section generates a focus control signal for controlling the position of the objective lens assembly 4 along the optical axis thereof such that the light is always focused on the optical recording medium 5. The tracking error signal is supplied to a tracking control section (not shown). Based on the tracking error signal, the tracking control section generates a tracking control signal for controlling the position of the objective lens assembly 4 along a tracking direction which is perpendicular to the optical axis of the assembly 4 such that the light is concentrated on a desired track of the optical recording medium 5. The actuator 65 drives the objective lens assembly 4 based on the focus control signal and the tracking control signal. The second optical detector 7 outputs information recorded on the optical recording medium 5 to a reproduction section (not shown).

The objective lens assembly 4 is now described in detail. FIG. 2 shows a structure of the objective lens assembly 4 used in the optical head 11 according to embodiment 1. In FIG. 2, the objective lens assembly 4 includes a first lens 21, a second lens 22, a first lens holder 23 for holding the first lens 21, a second lens holder 24 for holding the second lens 22, and an adhesive agent 25 for adhering the first lens holder 23 to the second lens holder 24.

The first lens 21 has a flat face 21A which is at a closer side to the optical recording medium 5 and an aspheric face 21B which is at a distant side from the optical recording medium 5. The second lens 22 is formed by combining two spherical lenses 22A and 22B. With such a structure, a lens assembly with a high NA of 0.7 or more can be realized (in embodiment 1, NA=0.85). Furthermore, chromatic aberration for light having a wavelength from 390 nm to 450 nm is corrected. Therefore, the obtained lens assembly is an achromatic lens assembly which is free from variation of a focal point.

Next, the first lens holder 23, the second lens holder 24, and adhesion of these holders are described. The first lens holder 23 has the shape of a hollow cylinder. The first lens holder 23 has an end face 23C which is at the side closer to the optical recording medium 5 and an end face 23A which is opposite to the end face 23C with respect to the optical recording medium 5. The first lens holder 23 has an opening 23B formed therein so as to have a step and penetrate through the end faces 23A and 23C. The first lens 21 is held in the opening 23B at the side of the end face 23C such that the optical axis thereof is substantially perpendicular to the end face 23A.

The second lens holder 24 has the shape of a hollow cylinder. The second lens holder 24 has an end face 24A which faces the end face 23A of the first lens holder 23 and which has substantially the same diameter as that of the end face 23A. The second lens holder 24 has an end face 24E which is opposite to the end face 24A with respect to the end face 23A of the first lens holder 23. The end face 24E has an opening 24B having a diameter greater than that of the opening 23B of the first lens holder 23. A bottom face 24C of the opening 24B has an aperture 24D having a diameter substantially the same as that of the opening 23B of the first lens holder 23. The second lens 22 is held inside the opening 24B such that the spherical lens 22B is in contact with the bottom face 24C in which the aperture 24D is formed. The second lens 22 is held such that the optical axis thereof is substantially perpendicular to the end face 24A.

As described above in the related art section, almost all of the component lenses (in this case, first lens 21 and second lens 22) has some aberration because there are some variations in the production of these lenses. When assembling a plurality of lenses each having aberration into a lens assembly, the aberrations may be combined. For example, in the case where each of the first lens 21 and second lens 22 has a total aberration of 70 mλ (Marshal's criteria), and the lenses 21 and 22 are combined into a lens assembly, the aberration of the lens assembly may result in 140 mλ at the worst. Such a lens assembly cannot be used in an optical head. In order to correct such aberration, correction aberration is generated by adjusting the relative positions of the first lens 21 and second lens 22 while building the lens assembly, and the aberrations that the first lens 21 and second lens 22 have are canceled with the generated correction aberration. In this case, it is necessary to reduce the aberration to 70 mλ (Marshal's criteria) or less by adjusting the relative positions of the first lens 21 and second lens 22. With this arrangement, light can be concentrated by the lens assembly. Furthermore, when such a lens assembly is used in the optical head 11 for recording information on the optical recording medium 5, the aberration must be 60 mλ or less, otherwise, cross erase or the like occurs, and satisfactory recording cannot be performed.

The relative positions of the first lens 21 and second lens 22 are represented by five axes shown in FIG. 2, i.e., three axes including X-, Y-, and Z-axes and two tilting axes indicated by arrows A1 and A2. When adjustment is performed along these five axes, one of the first lens 21 and second lens 22 must be movable along these five axes.

As described above in the related art section, in the case where the relative positions of the lenses (first lens 21 and second lens 22) are adjusted by moving the lenses themselves, a screw is used to move each lens, and accordingly, such a structure is not suitable for mass production. Further, the temperature characteristic of the objective lens assembly is deteriorated. In order to avoid such a problem, according to the present invention, the first lens 21 and second lens 22 are incorporated in the lens holders 23 and 24, respectively, and the relative positions of the first lens 21 and second lens 22 are adjusted by moving the lens holders 23 and 24 themselves. The positions in the lens holders 23 and 24 where the first lens 21 and second lens 22 are held may be determined with rough accuracy. Furthermore, it is not necessary to fix the first lens 21 and second lens 22 by an adhesive agent, the first lens 21 and second lens 22 may be fixed by using other methods, e.g., wiring.

After the relative positions of the first lens holder 23 and second lens holder 24 are adjusted along the five axes such that the aberration is a predetermined value of 70 mλ or less, the first lens holder 23 and second lens holder 24 are adhered to each other by the adhesive agent 25. The shape of each lens holder must be a shape which is adjustable along the above five axes. That is, it is necessary to provide a lens holder (first lens holder 23 and second lens holder 24) to each of the first lens 21 and second lens 22, and each of the first lens holder 23 and second lens holder 24 must be freely movable along the above five axes. For example, as shown in FIG. 2, the first lens holder 23 and second lens holder 24 must have shapes such that the end face 23A of the first lens holder 23 and the end face 24A of the second lens holder 24 faces each other and a gap between the end face 23A and the end face 24A can be filled with an adhesive agent. As described above in the related art section, the first lens holder 23 and the second lens holder 24 should not be arranged such that one fits into the other.

After the relative positions of the first lens holder 23 and second lens holder 24 are adjusted along the five axes such that the aberration is 70 mλ or less, the gap between the end face 23A and the end face 24A is filled with an adhesive agent, whereby the first lens holder 23 and second lens holder 24 are adhered to each other. That is, after the relative positions of the first lens holder 23 and second lens holder 24 are adjusted along the X-, Y-, and Z-directions and two tilting direction indicated by arrows A1 and A2, the first lens holder 23 and second lens holder 24 are adhered to each other with the adhesive agent 25. In this case, although it is necessary to adhesively combine the first lens holder 23 and second lens holder 24, it is not necessary to consider a distortion because this adhesion is made between the lens holders. Furthermore, it is not necessary to adhesively combine the lens holders as strongly as the adhesion between a component lens and a lens holder as described in the related art section, and therefore, the lens holders can be easily adhered to each other.

When the first lens 21 and second lens 22 are combined into a lens assembly as described above, light entering the second lens 22 is concentrated by the second lens 22, and this concentrated light is further concentrated by the first lens 21. Thus, the effective diameter of the first lens 21 is smaller than that of the second lens 22. Furthermore, in the second lens 22, the effective diameter of the spherical lens 22B is smaller than that of the spherical lens 22A. As a lens exists at a closer position to the optical recording medium 5, the effective diameter of the lens becomes smaller, and accordingly, the size of the lens can be reduced to a smaller size. Thus, the first lens holder 23 can be formed in a size smaller than that of the second lens holder 24. With such an arrangement, the total weight of the objective lens assembly 4 can be reduced, and the servo characteristics (sensitivity which is represented by a shift amount with respect to the size of a current flowing the actuator 65) of the optical head 11 can be improved. On the other hand, when the diameter of the end face 23A of the first lens holder 23 is the same as that of the end face 24A of the second lens holder 24, an area to which the adhesive agent 25 is applied is larger and accordingly, the adhesive strength is improved as compared with a case where the diameter of the end face 23A is smaller than that of the end face 24A.

When an objective lens assembly is used in an optical head, the objective lens assembly is required to have a high NA and various high functions, such as chromatic aberration correction. Accordingly, it is necessary to combine a plurality of lenses in order to produce such an objective lens assembly. In this case, the number of lenses included in the objective lens assembly is increased, and accordingly, the weight of the objective lens assembly is also increased, whereby the servo characteristics of the optical head are deteriorated. However, as described above, the effective diameter (size) of a component lens decreases as the component lens is located at a closer position to the optical recording medium 5, the weight of the lens assembly can be reduced, and as a result, the servo characteristic of the optical head can be improved.

Next, in the optical head, there are various types of stray light (for example, high-order light from the diffraction grating 2). Therefore, inside the first lens holder 23 and the second lens holder 24, it is desirable that light is prevented from being reflected as much as possible. For example, it is preferable that some anti-reflection means is provided, for example, a black almite treatment, application of black ink, etc. Alternatively, the lens holders 23 and 24 may be formed of a transparent material such as glass. In this case, reflection of light does not occur inside the lens holders. Thus, undesirable light leaking from the objective lens assembly can be reduced.

Next, the materials used for the first lens holder 23 and the second lens holder 24 are described. According to embodiment 1, the first lens holder 23 and the second lens holder 24 are formed of aluminum. In the case where the first lens holder 23 and the second lens holder 24 are formed of a metal, such as aluminum, even if thermal expansion of the lens holders is caused due to an increase in the environmental temperature outside of the optical head, the first lens holder 23 and the second lens holder 24 swell at a substantially uniform rate in every direction, and only the gap between the first lens 21 and the second lens 22 is increased, because the metal has an isotropic thermal expansion coefficient. Due to this expansion, spherical aberrations of the first lens 21 and the second lens 22 increase, but this increase in spherical aberration is small, and as such it is negligible. Thus, by forming the first lens holder 23 and the second lens holder 24 from a metal, a thermally stable objective lens assembly can be obtained.

In the case where the first lens holder 23 and the second lens holder 24 are formed of a resin, the lens holders 23 and 24 have an anisotropic thermal expansion coefficient due to the flow of resin caused during production of the lens holders 23 and 24. Thus, when heat is provided to the lens holders 23 and 24 due to an increase in the environmental temperature, etc., the lens holders 23 and 24 are distorted because of the anisotropic thermal expansion coefficient. Thus, in the case where the first lens holder 23 and the second lens holder 24 are formed of a resin, a factor which varies the positional relationship between the first lens 21 and the second lens 22 is added. Therefore, it is desirable to form the lens holders 23 and 24 from a metal as explained above. Furthermore, it is desirable to use a metal having a low specific gravity, such as magnesium, aluminum, etc., because the weight of the lens holders 23 and 24 is reduced, and as a result, the servo characteristics of the optical head are further improved.

However, only in view of the specific gravity, it is apparent that a resin material is desirable in improving the servo characteristics of the optical head as compared with a metal because the resin has a smaller specific gravity than that of the metal. Thus, a resin having an isotropic thermal expansion coefficient is more preferable because such a resin has a small specific gravity and rarely causes the variation of the relative position of lenses even if heat is applied. Thus, when the first lens holder 23 and the second lens holder 24 are formed of a resin having an isotropic thermal expansion coefficient, a lighter-weight objective lens assembly with superior servo characteristics can be obtained. Alternatively, the first lens holder 23 and the second lens holder 24 may be formed of different materials. For example, the first lens holder 23 may be formed of a metal, and the second lens holder 24 may be formed of a resin having an isotropic thermal expansion coefficient.

Next, the heights of the first lens holder 23 and the second lens holder 24 are described. As shown in FIG. 2, the height of the second lens holder 24 is sufficiently high so that the second lens 22 is entirely contained inside the second lens holder 24. Thus, since the second lens 22 is entirely contained inside the second lens holder 24, the probability that the second lens 22 is soiled by dust from outside of the objective lens assembly 4 is reduced. Furthermore, since the second lens 22 is entirely contained inside the second lens holder 24, the second lens holder 24 can be readily handled. Therefore, the optical head can be readily assembled.

Next, an aperture (opening) which determines an effective diameter of a lens assembly is described. As shown in FIG. 2, the aperture 24D is formed in the end face 24A which is closer to the recording medium 5 than the second lens 22 is. With such an arrangement, the size of the second lens holder 24 can be reduced as compared with a case where the aperture 24D is formed at the far side of the second lens holder 24 from the recording medium 5 such that the second lens 22 is located between the recording medium 5 and the aperture 24D. The reasons therefor are as follows.

The second lens 22 is a doublet, i.e., an assembled lens formed by a plurality of single-lenses (in this example, spherical lenses 22A and 22B). As described above, the effective diameter of the spherical lens 22B which is closer to the recording medium 5 is smaller than that of the spherical lens 22A which is further from the recording medium 5. Thus, the spherical lens 22B can be formed with a smaller size than that of the spherical lens 22A. Furthermore, the aperture 24D is formed at the side of the spherical lens 22B which is smaller than the spherical lens 22A, i.e., formed at a position closer to the recording medium 5 than the spherical lens 22B. Therefore, the diameter of the aperture 24D can be further smaller. Thus, it is possible to reduce the size of the second lens holder 24 in which the aperture 24D with a smaller diameter is formed.

On the other hand, if the aperture is formed in the end face 24E of the second lens holder 24 which is more distant from the optical recording medium 5 than the second lens 22, the second lens 22 is inserted in the second lens holder 24 through the end face 24A. Thus, it is necessary to form a sufficiently large opening in the end face 24A so that the second lens 22 can be inserted into the second lens holder 24 therethrough. When the opening having such a large diameter is formed in the end face 24A, the size of the second lens holder 24 is increased for securing an adhesion area as compared with a prefer able example shown in FIG. 2, and accordingly, the weight thereof is increased.

As the diameter of the aperture 24D increases, the relative positional offset between the second lens 22 and the aperture 24D becomes smaller. Thus, in view of reduction in variation of the NA of an entire lens assembly, a larger diameter of the aperture 24D is desirable.

Next, the size of the gap between the first lens holder 23 and the second lens holder 24 which is filled with the adhesive agent 25 is described. The adhesive agent 25 has a coefficient of thermal expansion such that the adhesive agent 25 expands when heat is applied to the lens assembly 4. As the adhesive agent 25 expands, the distance between the first lens 21 and the second lens 22 increases. Thus, it is necessary to control the size of the gap between the first lens holder 23 and the second lens holder 24 which is filled with the adhesive agent 25. In general, as the original length of an expanding element is greater, the amount of thermal expansion of the element is greater. In order to decrease the amount of thermal expansion, the gap between the first lens holder 23 and the second lens holder 24 should be smaller. For example, in the above-described lens assembly (NA= 0.85), it is desirable that the gap between the first lens holder 23 and the second lens holder 24 is 200 μm or less because, in such a case, generated spherical aberration is small with respect to an increase of temperature, and therefore this lens assembly can be successfully used in an optical head.

Next, providing a mirror face on an end face of the second lens holder 22 which is used for adjusting the relative positions of the first lens holder 23 and the second lens holder 24 is described. For example, the end face 24E of the second lens holder 24 which is opposite to the end face 24A is a mirror face. As described above, the relative positions of the first lens holder 23 and the second lens holder 24 are adjusted before these lens holders 23 and 24 are adhered to each other. Now, consider a case where the position of the first lens holder 23 is adjusted with reference to the position of the second lens holder 24. In this case, even when the first lens 21 is adhered to the first lens holder 23 such that the first lens 21 is substantially parallel to the second lens 22, if the second lens holder 24 which holds the second lens 22 is slanted, the first lens 21 has aberration with respect to incident light. When such occurs, the first lens holder 23 needs to be slanted with respect to the second lens holder 24 such that the aberration is removed. Accordingly, the first lens holder 23 and the second lens holder 24 are adhered to each other while both of these holders are slanted with respect to each other. A lens assembly including the thus-adjusted and combined lens holders 23 and 24 is incorporated in an optical head. In general, when a large NA is achieved, the distance between the optical recording medium 5 and a face of the lens assembly which is closest to the optical recording medium 5 is very short. For example, in embodiment 1, this distance is only about 150 μm. Thus, in this case where the first lens holder 23 is slanted with respect to the second lens holder 24, the first lens holder 23 may come into contact with the optical recording medium 5. Therefore, such a lens assembly cannot be used in an optical head.

In order to solve such a problem, it is necessary to keep the second lens holder 24 substantially unslanted. As described above, according to an embodiment of the present invention, the end face 24E is formed as a mirror face, and this mirror is used as a reference to adjust the relative positions of the first lens holder 23 and the second lens holder 24. With such an adjustment method, the degree of slant of the second lens holder 24 is significantly reduced, and as a result, the degree of slant of the first lens holder 23 is also reduced. For example, the second lens holder 24 is made of a resin, a mirror face may be formed on the end face 24E by metal plating or deposition of a thin film. It should be noted that, although the mirror face is formed on the second lens holder 24 in this example, the mirror face may be formed on the first lens holder 23 because the mirror face is used as a reference when assembling the lens assembly.

It is preferable that the first lens holder 23 and the second lens holder 24 are formed of the same material as that used for a movable member (not shown) of the actuator 65 (FIG. 1) which drives the objective lens assembly 4 such that the position of the objective lens assembly 4 is controlled. In this case, when an environmental temperature of the optical head 11 changes, such a change of temperature influences the actuator 65 and the objective lens assembly 4. However, since both the lens holders 23 and 24 and the movable member of the actuator 65 to which the lens holders 23 and 24 are attached are formed of the same material, the coefficient of thermal expansion is the same for these components. Accordingly, the amount of thermal expansion is also the same for both of the lens holders 23 and 24 and the movable member of the actuator 65, and therefore, distortion is not caused between these components. Thus, the temperature characteristic of the objective lens assembly 4 is improved.

According to embodiment 1, the first lens 21 and the first lens holder 23 may be integrally formed. Further, the second lens 22 and the second lens holder 24 may also be integrally formed.

In the example illustrated in FIG. 2, the aperture 24D is formed in the second lens holder 24, but the present invention is not limited thereto. The aperture 24D may be formed in the first lens holder 23.

In embodiment 1, the external shape of the first lens holder 23 is different from that of the second lens holder 24. However, the external shape of the lens holders 23 and 24 may be the same.

As described above, according to embodiment 1, the first lens 21 and the second lens 22 are held in the first lens holder 23 and the second lens holder 24, respectively. The lens holders 23 and 24 are located such that the end face 23A of the first lens holder 23 faces the end face 24A of the second lens holder 24, and the relative positions of the lens holders 23 and 24 are adjusted. After the adjustment is completed, an adhesive agent is supplied into the gap between the lens holders 23 and 24. In this way, an objective lens assembly which has a superior temperature characteristic and which is suitable for mass production can be obtained. Furthermore, this objective lens assembly is used to produce an optical head with a superior temperature characteristic which is suitable for mass production and which can operate with a high-density optical recording medium can be realized.

According to embodiment 1, the first lens holder 23 is formed such that the diameter of a cross-section thereof is smaller than the diameter of the second lens holder 24, whereby the weight of the objective lens assembly 4 can be reduced.

According to embodiment 1, even in the production of an objective lens assembly having a NA of 0.7 or more where the relative positions of respective component lenses must be strictly determined with high accuracy, the relative positions of the component lenses can be readily adjusted, such that an objective lens assembly highly suitable for mass production is provided.

According to embodiment 1, even in the production of an objective lens assembly in which chromatic aberration for light having a wavelength from 390 nm to 450 nm is corrected and in which the relative positions of respective component lenses must be strictly determined with high accuracy, the relative positions of the component lenses can be readily adjusted, such that an objective lens assembly highly suitable for mass production is provided.

According to embodiment 1, after the relative positions of the first lens holder 23 and second lens holder 24 are adjusted along the five axes such that the aberration is a predetermined value of 70 m$\lambda$ or less, the first lens holder 23 and second lens holder 24 are adhered to each other by the adhesive agent 25. Therefore, the aberrations that the first lens 21 and second lens 22 have are canceled by the adjustment. Thus, an objective lens assembly suitable for mass production where the lenses 21 and 22 may be incorporated into the lens holders 23 and 24 with rough accuracy can be obtained.

According to embodiment 1, the diameter of the end face 23A of the first lens holder 23 is the same as that of the end face 24A of the second lens holder 24. The area over which the adhesive agent 25 is applied increases, whereby the adhesion strength can be improved.

According to embodiment 1, a black almite treatment is performed on the inside walls of the lens holders 23 and 24, or the lens holders 23 and 24 are made of a transparent material, whereby an objective lens assembly where reflection of stray light is prevented inside the lens holders 23 and 24 can be realized.

According to embodiment 1, when the lens holders 23 and 24 are formed of a metal, an objective lens assembly having a superior temperature characteristic can be obtained. Alternatively, when the lens holders 23 and 24 are formed of a resin, a light-weight objective lens assembly can be realized. When the lens holders 23 and 24 are formed of a resin having an isotropic thermal expansion coefficient, a light-weight objective lens assembly having a superior temperature characteristic can be realized.

According to embodiment 1, when the aperture 24D is formed in a face of the second lens holder 24 which is closer to the first lens holder 23 than the other faces, a light-weight objective lens assembly can be realized. When the aperture 24D is formed in a face of the second lens holder 24 which is more distant from the first lens holder 23 than the other faces, variation in the NA of the objective lens assembly can be minimized.

According to embodiment 1, when the size of a gap between the lens holders 23 and 24 into which the adhesive agent is supplied is 200 $\mu$m or less, an objective lens with a high NA which has a superior temperature characteristic can be realized.

According to embodiment 1, a mirror face is formed on a lowermost surface of a lens holder, whereby a lens holder can be readily assembled.

Figure 3:
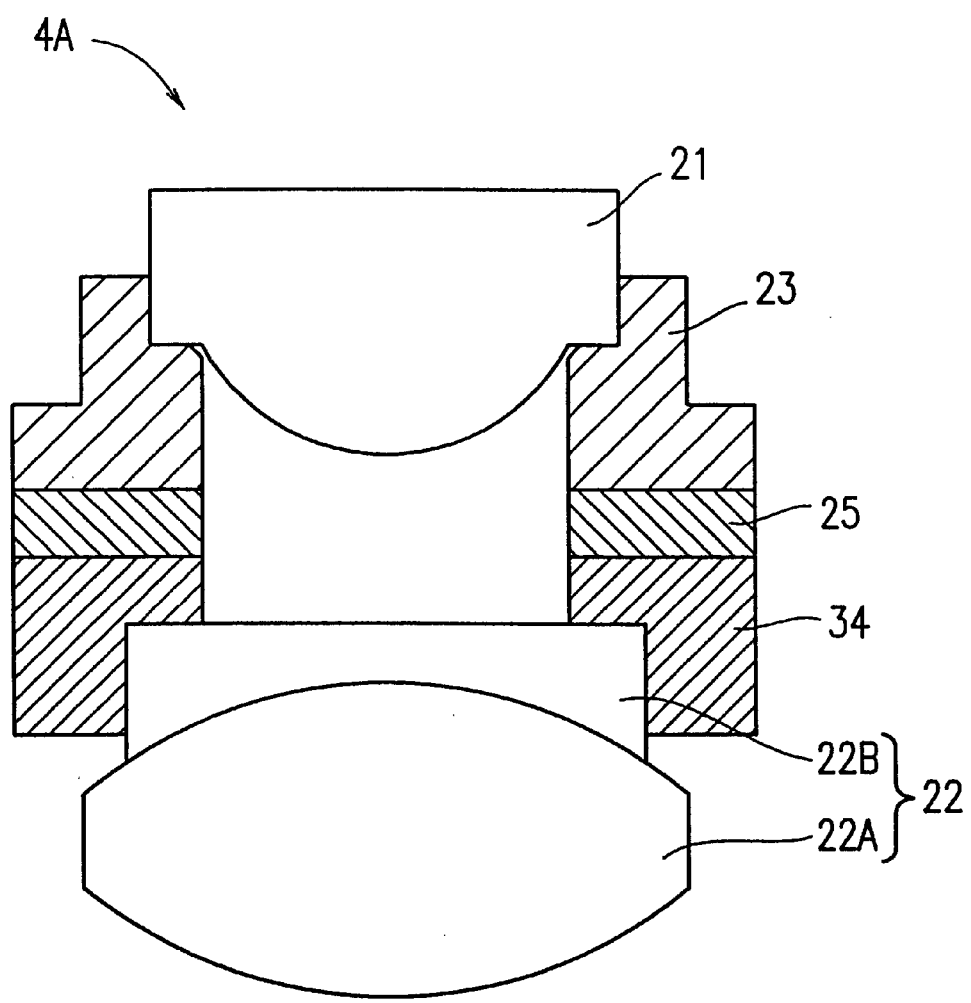
FIG. 3 shows a structure of another objective lens assembly according to embodiment 1 of the present invention.

FIG. 3 shows another exemplary structure of an objective lens assembly for use in the optical head 11 according to embodiment 1. In FIG. 3, like elements are indicated by like reference numerals used for the objective lens assembly of FIG. 2, and detailed descriptions thereof are omitted. An objective lens assembly 4A of FIG. 3 includes a second lens holder 34. The second lens holder 34 is formed such that the height along the optical axis is shorter than that of the second lens holder 24 of FIG. 2, and a portion of a second lens 22 is not contained inside the second lens holder 34. The size of the second lens holder 34 is smaller than that of the second lens holder 24 of FIG. 2, and accordingly, the weight of the second lens holder 34 is less than that of the second lens holder 24. Therefore, the servo characteristics of an optical head including the objective lens assembly 4A can be improved, and the weight of the optical head can be reduced.

As described above, according to embodiment 1, when a lens is entirely contained inside a lens holder, a dust-resistive objective lens assembly which can be readily incorporated in an optical head can be realized. Alternatively, when a lens is not entirely contained inside a lens holder, an objective lens assembly having a significantly reduced weight can be realized.

Embodiment 2

Embodiment 2 of the present invention is described with reference to the drawings. In embodiment 2, the shapes of component lenses used in an objective lens assembly are different from those used in embodiment 1. In embodiment 2, like elements are indicated by like reference numerals used in embodiment 1, and detailed descriptions thereof are omitted.

Figure 4:
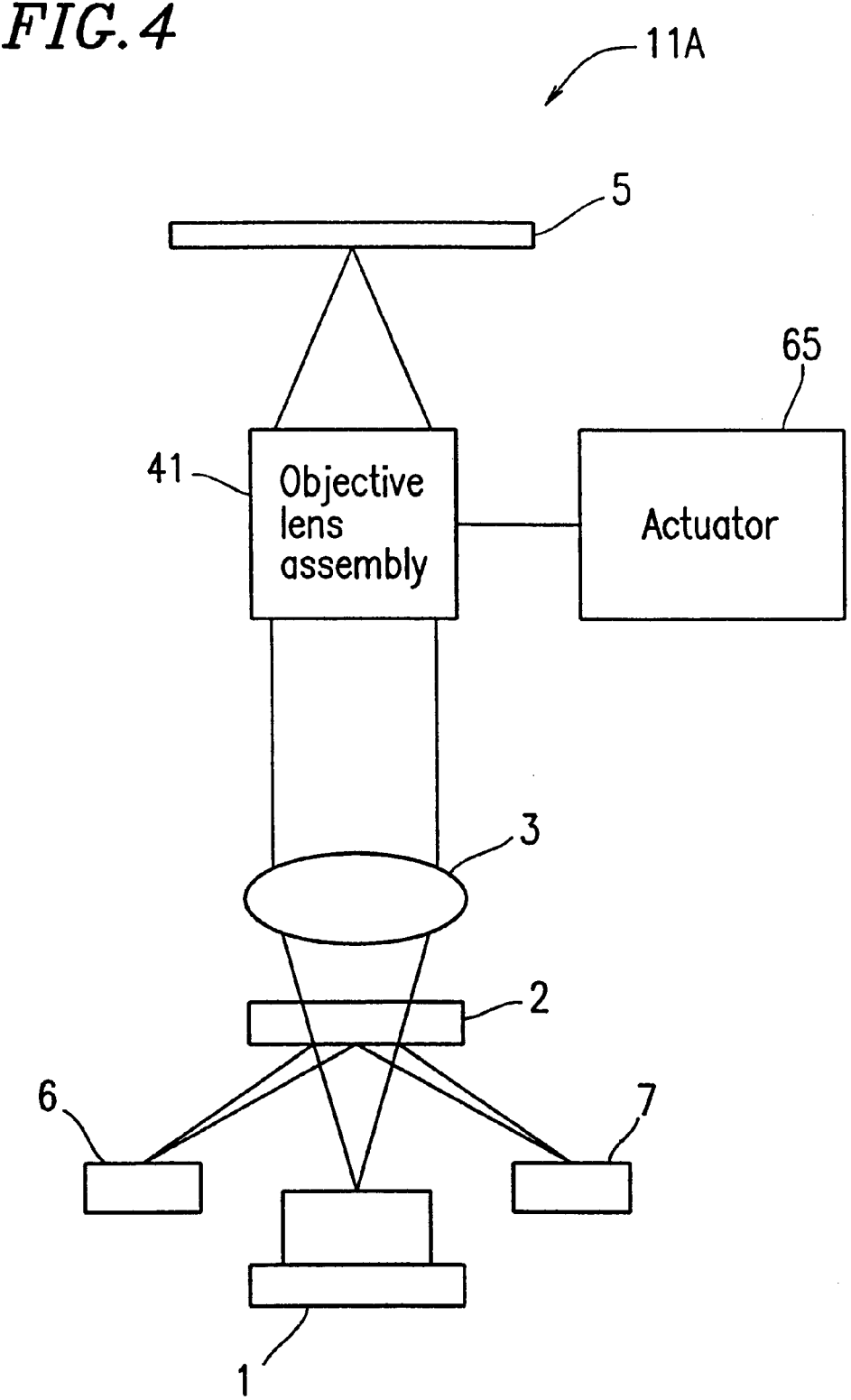
FIG. 4 is a schematic view showing a structure of an optical head according to embodiment 2 of the present invention.

FIG. 4 shows a structure of an optical head 11A according to embodiment 2 of the present invention. The optical head 11A includes an objective lens assembly 41 in place of the objective lens assembly 4 described in embodiment 1. Operation of the optical head 1A is the same as that described in embodiment 1, and the description thereof is omitted.

Figure 5:
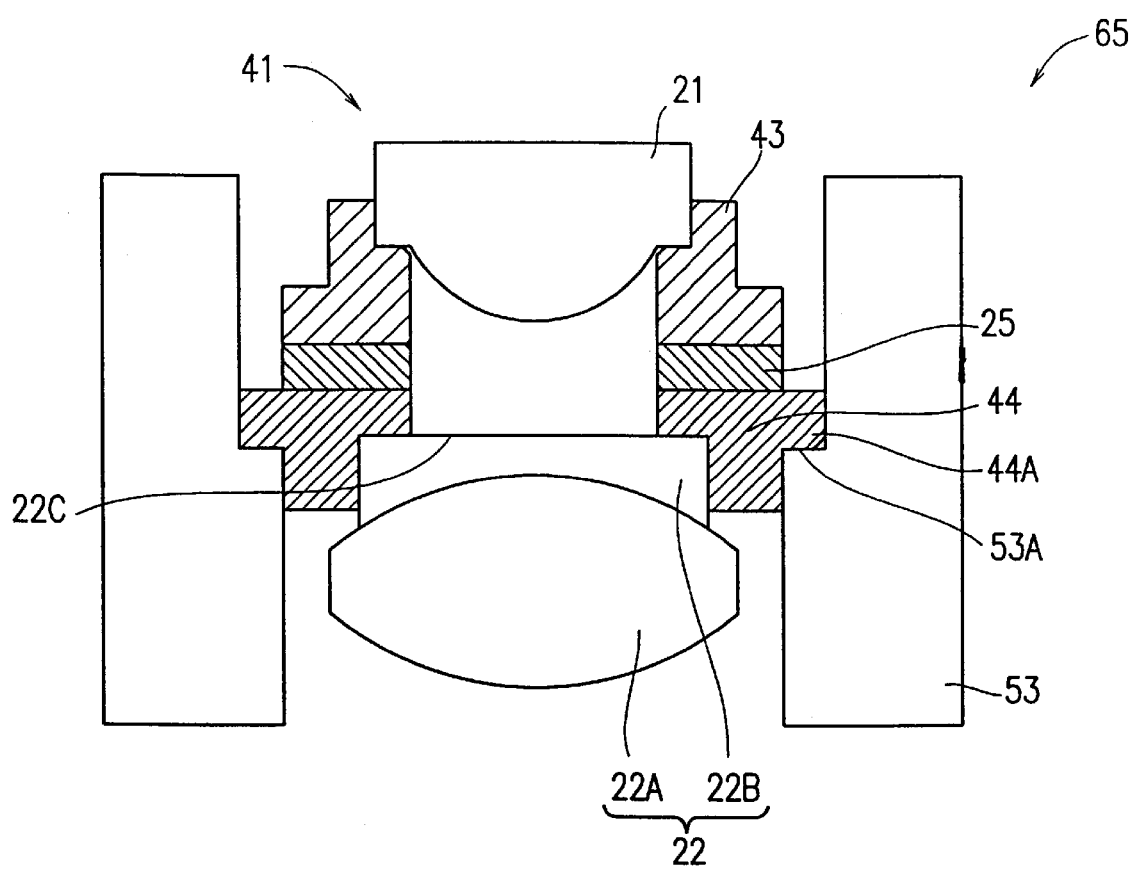
FIG. 5 shows a structure of an objective lens assembly according to embodiment 2 of the present invention.

The objective lens assembly 41 according to embodiment 2 is now described in detail. FIG. 5 shows a structure of the objective lens assembly 41 according to embodiment 2. The objective lens assembly 41 includes a first lens 21, a second lens 22, a first lens holder 43 for holding the first lens 21, a second lens holder 44 for holding the second lens 22, and an adhesive agent 25 for adhering the first lens holder 43 and the second lens holder 44. The second lens 22 includes spherical lenses 22A and 22B. The objective lens assembly 41 is coupled to the actuator 65 which drives the objective lens assembly 41 in such a manner that the position of the objective lens assembly 41 is controlled based on an electrical signal generated by the first optical detector 6 (FIG. 4). The actuator 65 has a movable member 53 for coupling with the objective lens assembly 41. The second lens holder 44 has an engagement portion 44A for engaging with the movable member 53 of the actuator 65.

In this structure, it is very important that a portion of the objective lens assembly 41 which corresponds to the centroid of the objective lens assembly 41 is fixed to the actuator 65. Otherwise, the actuator 65 resonates with the objective lens assembly 41 due to the vibration of the actuator 65 which may be caused when changing the position of the objective lens assembly 41. As such, the frequency characteristic of the actuator 65 does not extend to a high frequency range. Therefore, the servo characteristics of the optical head are deteriorated. In order to remove such a resonance, the engagement portion 44A is provided at a position corresponding to a plane which includes the centroid of the objective lens assembly 41 and which is perpendicular to the optical axis of the lenses (in the example illustrated in FIG. 5, an upper end face 22C of the spherical lens 22B of the second lens 22), and the engagement portion 44A is fixed to an engagement portion 53A formed in the movable member 53 of the actuator 65. In such a structure, the servo characteristics of the actuator 65 are significantly improved.

The centroid position of the objective lens assembly 41 is described. The objective lens assembly 41 is driven by the actuator 65: specifically, the actuator 65 receives an electric current from outside, and the electric current is allowed to flow through a coil; by changing the size of the current, the size of a magnetic field generated is changed; and a repulsion which occurs between the magnetic field generated by the coil and a magnetic field of a fixed magnet is used to drive the objective lens assembly 41. The center of driving of the actuator 65 is determined based on the position of the fixed magnet. In view of the frequency characteristic of the actuator 65, it is optimum that the center of driving of the actuator 65 coincides with the centroid of the objective lens assembly 41.

The centroid of the objective lens assembly 41 is determined based on the focal distance of each component lens of the objective lens assembly 41, the specific gravity of the material of the lens holder for holding the component lens, and the position of the optical recording medium. The center of driving of the actuator 65 is determined based on the position of the magnet, and the position of the magnet is determined based on deviation with respect to the optical recording medium, etc. Thus, the centroid of the objective lens assembly and the center of driving of the actuator 65 are determined based on different factors and therefore do not necessarily coincide with each other.

In embodiment 2, the position of the centroid of the objective lens assembly 41 largely varies according to the specific gravity of the lens holder material. However, the position of the centroid of the objective lens assembly 41 can be freely changed by changing the material and shape of the first lens holder 43 and the second lens holder 44. Thus, the centroid of the objective lens assembly 41 can be adjusted so as to precisely coincide with the center of driving of the actuator 65.

As described above, according to embodiment 2, the engagement portion 44A is provided at a position corresponding to a plane which includes the centroid of the objective lens assembly 41 and which is perpendicular to the optical axis of the lenses. With such an objective lens assembly 41, an optical head where the servo characteristics of the actuator 65 are significantly improved can be realized. The centroid of the objective lens assembly 41 can be set to any position by changing the material and shape of the lens holders.

In the above example, the engagement portion 44A is provided in the second lens holder 44. However, the position of the engagement portion 44A is determined based on the position of the centroid of the objective lens assembly 41, and therefore, the engagement portion 44A may be provided in the first lens holder 43.

In the above example, the engagement portion is provided in a lens holder for holding a single lens. However, the lens holder in which the engagement portion is provided may be formed into any structure. For example, the engagement portion may be provided in a lens holder which contains all of the component lenses.

In the above example, the engagement portion and the lens holders are formed of a same material. However, these components may be formed of different materials.

Figure 6A:
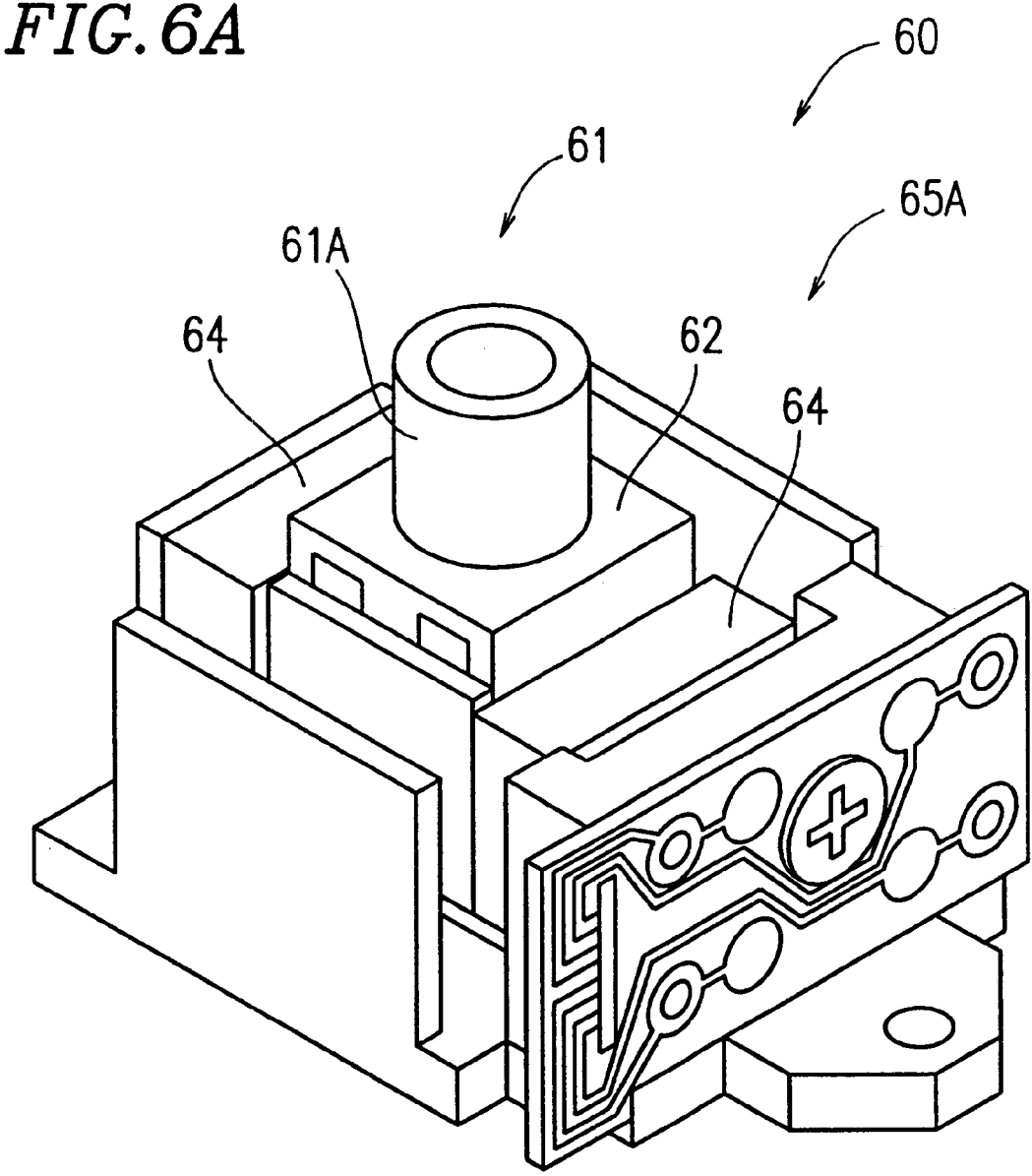
FIG. 6A is a perspective view showing an example of an optical head according to embodiment 2 of the present invention.
Figure 6B:
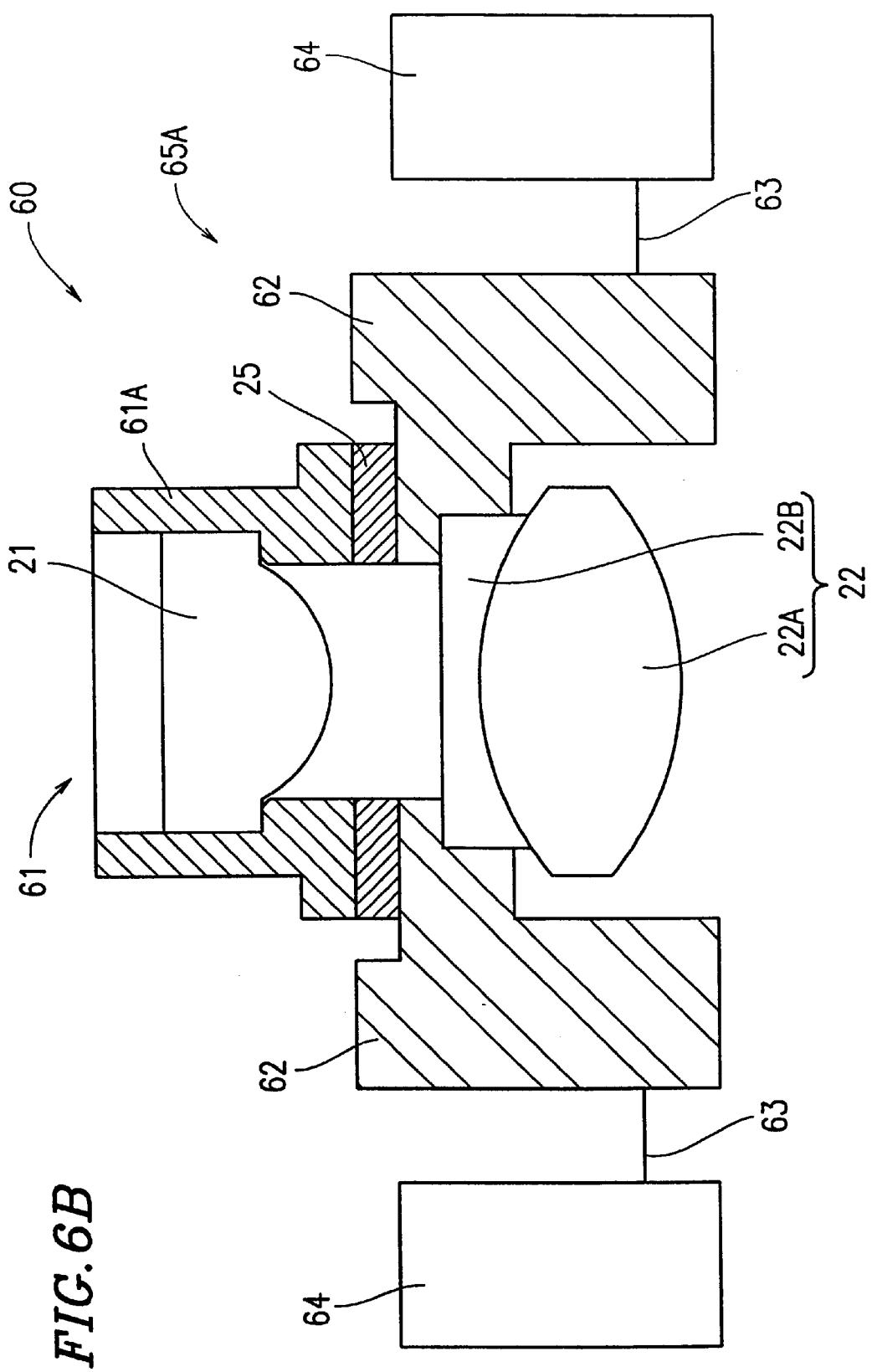
FIG. 6B is a cross-sectional view showing a principal portion of the optical head shown in FIG. 6A.

Next, a variation of embodiment 2 is described. FIG. 6A is a perspective view showing an example of an optical head according to embodiment 2. FIG. 6B is a cross-sectional view showing a principal portion of the optical head shown in FIG. 6A. In the optical head 60 shown in FIGS. 6A and 6B, a movable member of an actuator also functions as a second lens holder.

In FIGS. 6A and 6B, the optical head 60 includes an objective lens assembly 61, and an actuator 65A for driving the objective lens assembly 61 such that the position of the objective lens assembly 61 is controlled. The actuator 65A includes: a movable member 62 which also functions as a second lens holder of the objective lens assembly 61; a wire 63 for holding the movable member 62: and a magnet 64 for driving the movable member 62 through the wire 63. The wire 63 functions as movable member holding means. The magnet 64 functions as movable member driving means. As shown in FIGS. 6A and 6B, the movable member 62 of the actuator 65A also functions as the second lens holder. A positionally-adjusted first lens holder 61A for holding the first lens 21 is adhered onto the movable member 62 of the actuator 65A. When such a structure is employed, the number of steps for assembling the optical head is reduced as compared with a case where an objective lens assembly is formed before this objective lens assembly is incorporated in an actuator.

In the above example, the movable member of the actuator also functions as a second lens holder. However, the movable member of the actuator may also function as a first lens holder.

As described above, according to embodiment 2, the movable member of the actuator also functions as a lens holder of the objective lens assembly. With such a structure, the number of steps for assembling the optical head is reduced. As a result, an optical head suitable for mass production can be realized.

Embodiment 3

FIG. 7 shows a structure of an objective lens assembling/adjusting apparatus 700 according to embodiment 3 of the present invention. The objective lens assembling/adjusting apparatus 700 corrects aberrations of the objective lens assembly 4 of embodiment 1 with high accuracy. The objective lens assembly 4 is formed from a plurality of lenses (e.g., at least two or more lenses, or at least two or more groups of lenses) for the purpose of correcting chromatic aberration with respect to a wavelength used. In embodiment 3, like elements are indicated by like reference numerals used in embodiment 1, and detailed descriptions thereof are omitted.

Referring to FIG. 7, a light source 126 is provided so as to emit divergent light toward the second lens holder 24 of the objective lens assembly 4. Provided between the light source 126 and the second lens holder 24 is a collimator lens 7 for converting the divergent light from the light source 126 into parallel light which is supplied to the objective lens assembly 4. Provided on the opposite side of the objective lens assembly 4 with respect to the light source 126 is a diffraction grating 116 for generating interference fringes (described later) based on light 115 which is output from the first lens held in the first lens holder 23 of the objective lens assembly 4. Behind the diffraction grating 116, there is provided a CCD camera 121 for detecting the interference fringes generated by the diffraction grating 116. The CCD camera 121 is connected to an aberration calculation section 704 for calculating the aberration of the objective lens assembly 4 based on the interference fringes detected by the CCD camera 121, and to a numerical aperture management section 705 for managing the numerical aperture (NA) of the objective lens assembly 4 based on the interference fringes.

The objective lens assembling/adjusting apparatus 700 includes: a first driving device 701 for adjusting the position of the first lens holder 23 based on the aberration of the objective lens assembly 4 which is calculated by the aberration calculation section 704; and a second driving device 702 for adjusting the position of the second lens holder 24 based on the aberration of the objective lens assembly 4. The first driving device 701 includes: a first XY-stage 134 for driving the first lens holder 23 to move along the X- and Y-directions; a first Z-stage 135 for driving the first lens holder 23 to move along the Z-direction; and a first slant adjustment stage 133 for adjusting the slant of the first lens holder 23 along the slant directions with respect to the X- and Y-directions. The second driving device 702 includes: a second XY-stage 130 for driving the second lens holder 24 to move along the X- and Y-directions; a second Z-stage 131 for driving the second lens holder 24 to move along the Z-direction; and a second slant adjustment stage 129 for adjusting the slant of the second lens holder 24 along the slant directions with respect to the X- and Y-directions. With these driving devices 701 and 702, the first lens holder 23 and the second lens holder 24 can be adjusted along the above five axes.

The divergent light emitted by the light source 126 is converted by the collimator lens 7 into parallel light 127 and transmitted through the second lens 22 held by the second lens holder 24 and the first lens 21 held by the first lens holder 23 of the objective lens assembly 4.

Figure 8:
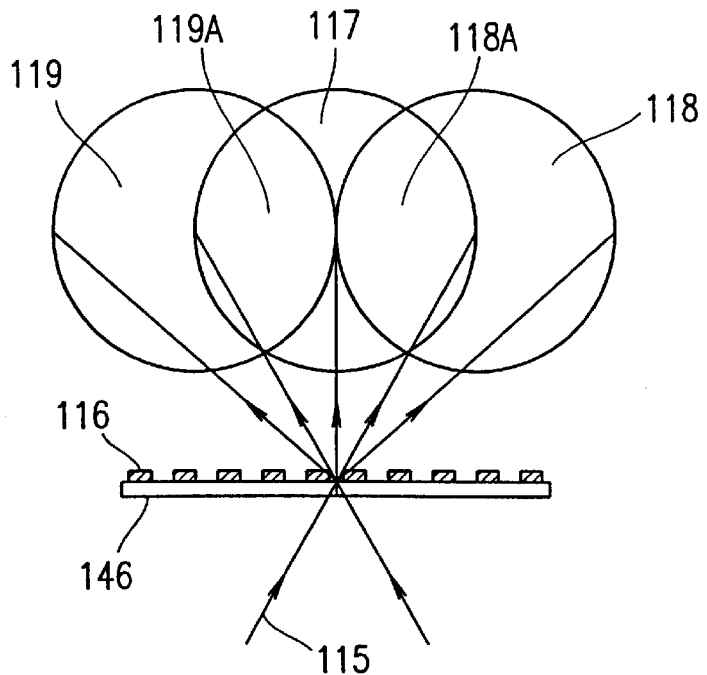
FIGS. 8 through 10 illustrate a principle of an objective lens assembling/adjusting method according to embodiment 3 of the present invention.

FIG. 8 illustrates a principle of an objective lens assembling/adjusting method according to embodiment 3 of the present invention. The light 115 transmitted through the first lens 21 of the objective lens assembly 4 (FIG. 7) is concentrated on the diffraction grating 116 which is formed on a glass substrate 146. The light 115 concentrated on the diffraction grating 116 is separated into +1st-order diffraction light 119, −1st-order diffraction light 118, and transmitted light 117. In each of an overlapping area 119A of the +1st-order diffraction light 119 and the transmitted light 117 and an overlapping area 118A of the −1st-order diffraction light 118 and the transmitted light 117, interference fringes emerge. These interference fringes are detected by the CCD camera 121 (FIG. 7).

Referring to FIG. 7, the aberration calculation section 704 calculates, based on the interference fringes detected by the CCD camera 121, each aberration component of the objective lens assembly 4, i.e., third-order spherical aberration, third-order comatic aberration, fifth-order comatic aberration, third-order astigmatism, etc. Based on the respective aberration components calculated by the aberration calculation section 704, the first driving device 701 and the second driving device 702 separately drive the first lens holder 23 and the second lens holder 24, respectively, thereby adjusting the positions of the first lens 21 and the second lens 22 such that each of the aberration components of the objective lens assembly 4 becomes equal to or lower than a predetermined value.

By driving the first lens holder 23 and the second lens holder 24 to move along the X- and Y-directions and the slant directions with respect to the X- and Y-directions shown in FIG. 7, aberration components which are asymmetrical with respect to the circumferential direction of the objective lens assembly 4, such as third-order comatic aberration, fifth-order comatic aberration, third-order astigmatism, etc., can be corrected. By driving the first lens holder 23 and the second lens holder 24 to move along the Z-direction, third-order spherical aberration and fifth-order spherical aberration can be corrected. The predetermined value for each aberration component of the objective lens assembly 4 is set to, for example, 0.01 mλ.

The thickness of the glass substrate 146 shown in FIG. 8 is determined such that the glass substrate 146 has aberration substantially equal to that of an optical disc carrier on which an optical recording/reproduction apparatus incorporating a completed objective lens assembly performs recording and/or reproduction. The present inventors used a quartz substrate having a thickness of 98 μm as the glass substrate 146, and formed the diffraction grating 116 on this quartz substrate.

In the case of an objective lens assembly produced for an optical head which is used with a DVD, the third-order comatic aberration can be reduced by adjusting objective lens tilt on the optical head. Thus, the adjustment step which uses the first slant adjustment stage 133 and the second slant adjustment stage 129 may be omitted, and instead, third-order comatic aberration may be corrected through the facing angle adjustment.

Furthermore, in the case where the optical system of the optical head includes an active device which can correct spherical aberration and comatic aberration, such as a liquid crystal device, the adjustment steps for correcting the spherical aberration and comatic aberration may be omitted.

In this way, each aberration component of an objective lens assembly can be separately reduced. Therefore, the aberration characteristics of the objective lens can be improved. As a result, an objective lens assembly with a superior focusing characteristic can be produced.

Next, a method for managing the numerical aperture (NA) of an objective lens assembly according to embodiment 3 is described. As described above, when an objective lens having a high NA is required, a lens assembly is employed. Variation of the numerical aperture causes various problems. For example, when the numerical aperture is very large, light output from the lens assembly can be concentrated onto a small area, and accordingly, a superior detection signal from an optical disc is improved. However, if an optical disc carrier is slanted during reproduction on the optical disc, large aberration is caused due to such a very large numerical aperture. As a result, the signal quality widely varies during reproduction. Conversely, when the numerical aperture is very small, the light focusing characteristic is deteriorated, and as a result, a detection signal with satisfactory quality cannot be obtained from the optical disc. Thus, management of the numerical aperture of the objective lens assembly is very important.

With the objective lens assembling/adjusting apparatus 700 according to embodiment 3, the numerical aperture of an objective lens assembly can be readily managed. Based on the numerical aperture of the objective lens assembly, the pitch P of the diffraction grating 116 is determined as follows:

$$P=\lambda/NA$$

The numerical aperture of the objective lens assembly is determined based on the diameter of the aperture, and the diameter of the aperture is determined with a mechanical accuracy as shown in FIG. 2. Referring to FIG. 8, when light 115 output from an objective lens assembly having an aperture which is accurately formed as prescribed enters the diffraction grating 116, the area of the −1st-order diffraction light 118 and the area of the +1st-order diffraction light 119 are in contact with each other as shown. In this case, the overlapping areas 118A and 119A are maximum, and therefore, the aberration of the objective lens assembly 4 can be measured with maximum accuracy.

Figure 9:
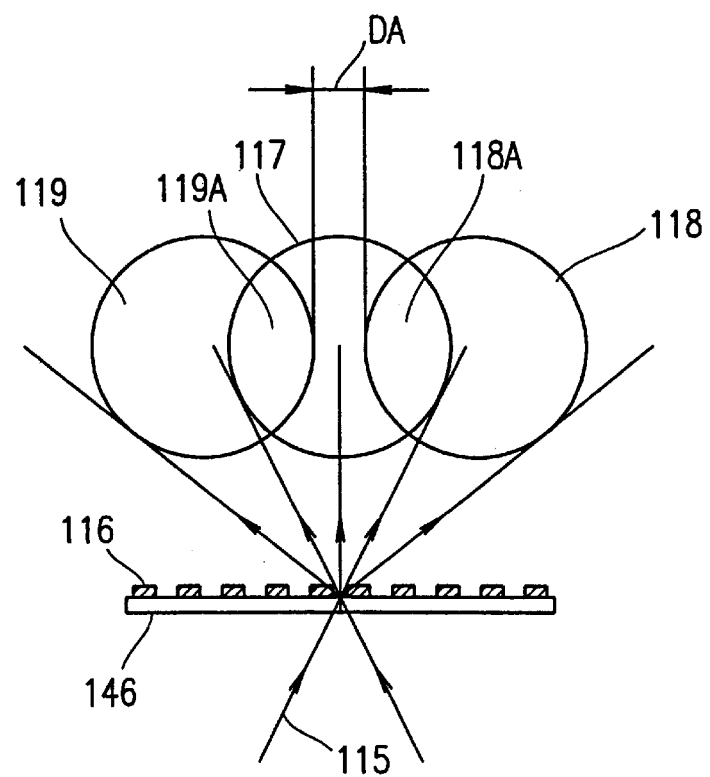
Figure 10:
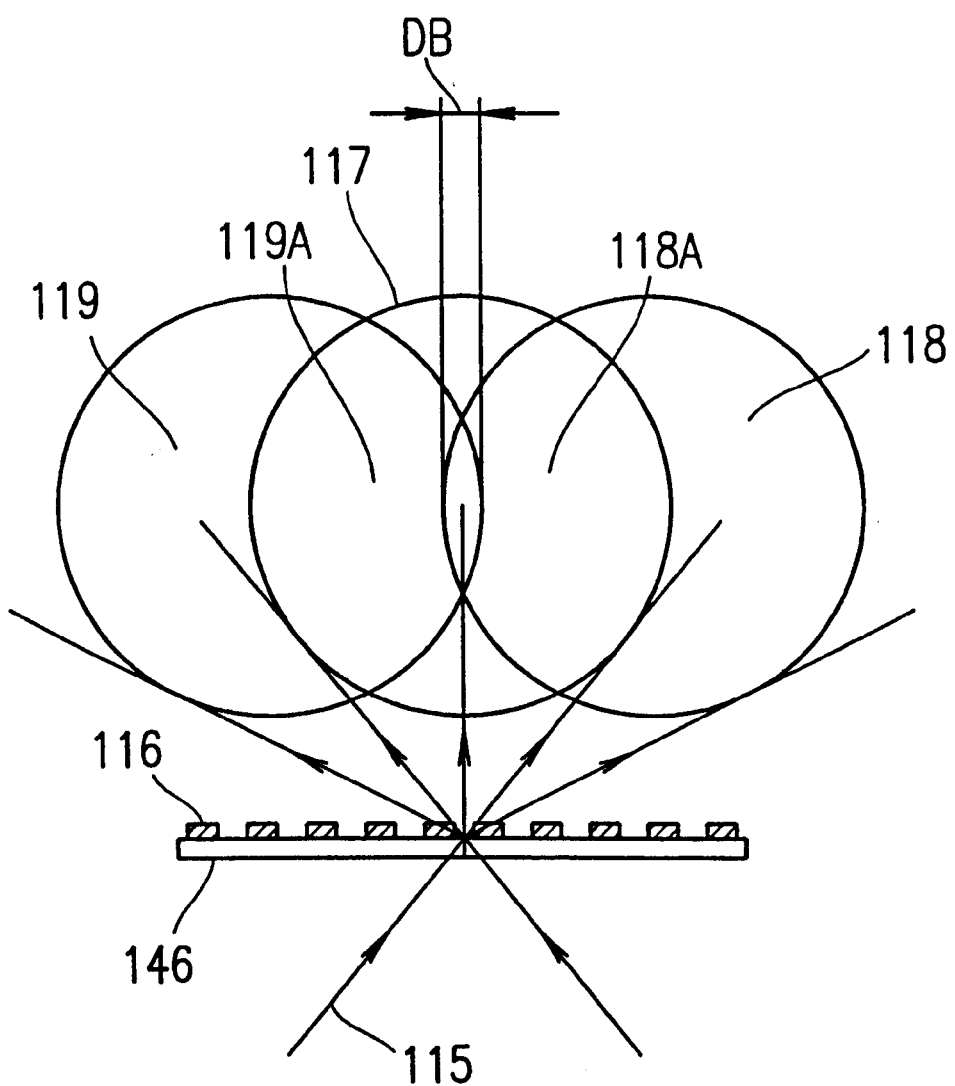

FIG. 9 shows the overlapping areas 118A and 119A when the aperture of the objective lens assembly is smaller than the prescribed value. In this case, there is a gap DA between the overlapping areas 118A and 119A. FIG. 10 shows the overlapping areas 118A and 119A when the aperture of the objective lens assembly is greater than the prescribed value. In this case, the overlapping areas 118A and 119A overlap with each other by the overlapping distance DB. The CCD camera 121 detects the gap DA or the overlapping distance DB. The numerical aperture management section 705 determines whether or not the gap DA detected by the CCD camera 121 is equal to or greater than a predetermined value. If the gap DA is equal to or greater than the predetermined value, the numerical aperture management section 705 determines that the numerical aperture of the objective lens assembly is smaller than the prescribed value. Alternatively, the numerical aperture management section 705 determines whether or not the overlapping distance DB detected by the CCD camera 121 is equal to or greater than a predetermined value. If the overlapping distance DB is equal to or greater than the predetermined value, the numerical aperture management section 705 determines that the numerical aperture of the objective lens assembly is greater than the prescribed value. In this way, by detecting the gap DA and the overlapping distance DB, the numerical aperture of the objective lens assembly can be managed.

Embodiment 4

In embodiment 4 of the present invention, an example of an optical recording/reproduction apparatus according to the present invention is described. The optical recording/reproduction apparatus according to embodiment 4 performs recording and/or reproduction of an information signal on an optical recording medium.

Figure 11:
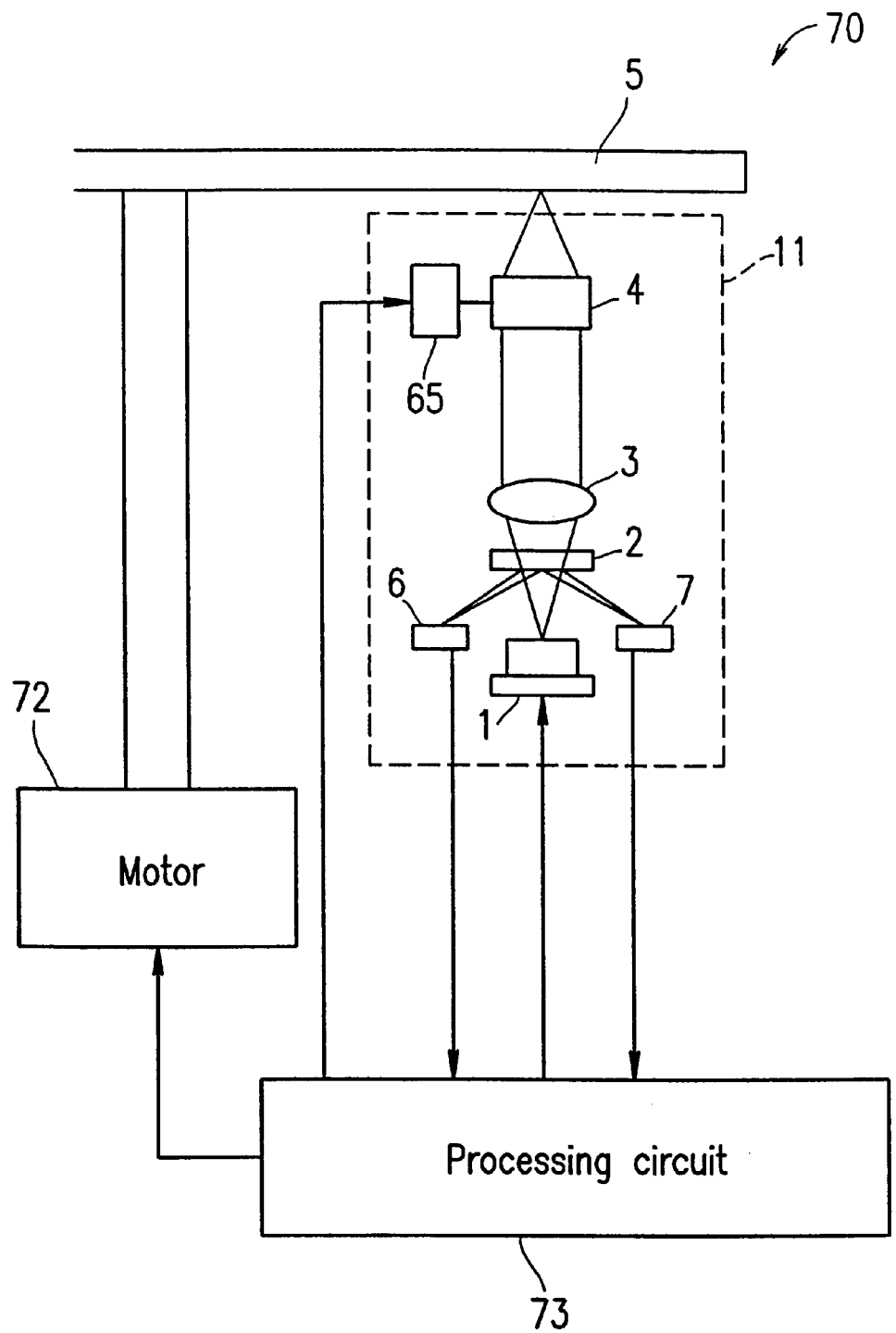
FIG. 11 is a schematic view showing a structure of an optical head according to embodiment 4 of the present invention.
Figure 13:
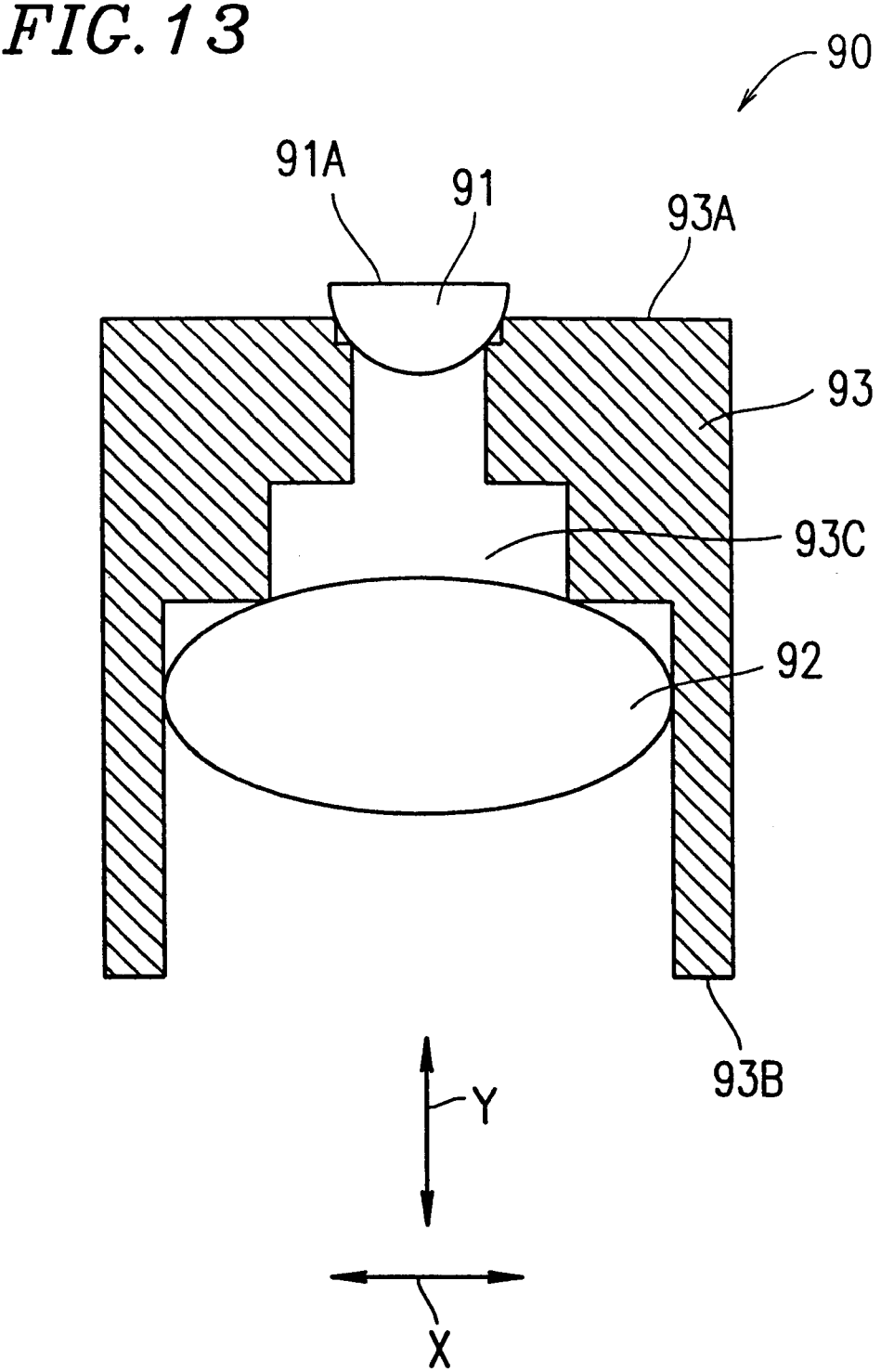
FIG. 13 shows an exemplary structure of another conventional lens assembly.
Figure 14:
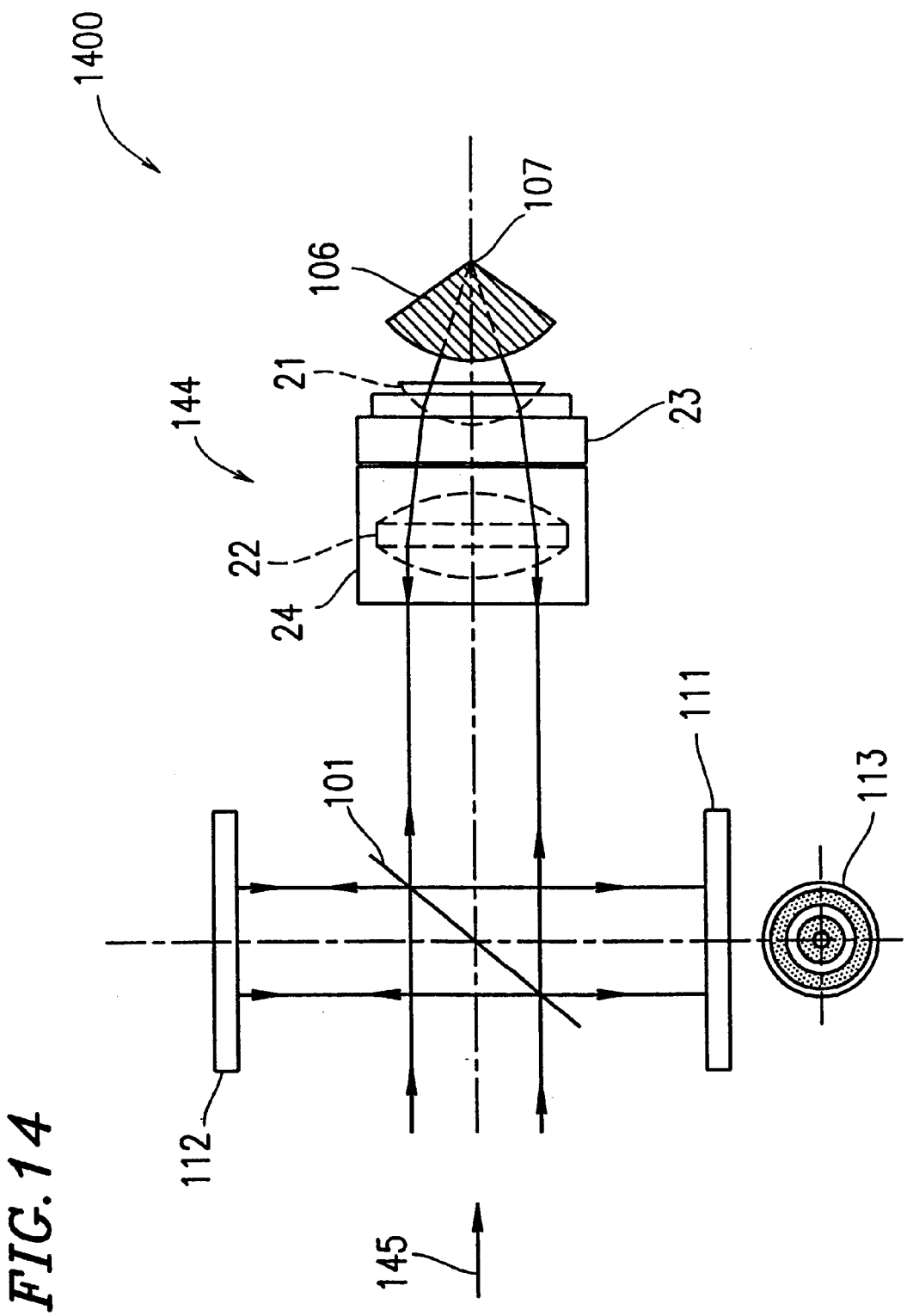
FIG. 14 shows an exemplary structure of a conventional objective lens assembling/adjusting apparatus.

FIG. 11 schematically shows a structure of an optical recording/reproduction apparatus 70 according to embodiment 4. In FIG. 11, like elements are indicated by like reference numerals used for the optical head 11 of FIG. 1, and detailed descriptions thereof are omitted.

The optical recording/reproduction apparatus 70 includes an optical head 11, a motor 72, and a processing circuit 73. The optical head 11 is the same as that described in embodiment 1, and therefore, a detailed description thereof is herein omitted.

Next, an operation of the optical recording/reproduction apparatus 70 is described. First, when the optical recording medium 5 is set in the optical recording/reproduction apparatus 70, the processing circuit 73 outputs a signal for rotating the motor 72. Then, the processing circuit 73 drives the light source 1 to emit linearly polarized light.

Some components of the linearly polarized light emitted by the light source 1 are transmitted through the diffraction grating 2 to enter the collimator lens 3, and are converted by the collimator lens 3 into parallel light. The parallel light is concentrated on the optical recording medium 5 by the objective lens assembly 4. The light reflected by the optical recording medium 5 is transmitted through the objective lens assembly 4 and the collimator lens 3 again, and diffracted by the diffraction grating 2. The diffracted +1st-order light enters the first optical detector 6, and the diffracted −1st-order light enters the second optical detector 7.

The first optical detector 6 outputs to the processing circuit 73 a focus error signal which indicates the focusing state of the light on the optical recording medium 5 and a tracking error signal which indicates a position on the optical recording medium 5 which is irradiated with the light. Based on these signals, the processing circuit 73 generates a control signal for controlling the objective lens assembly 4. The actuator 65 drives the objective lens assembly 4 based on the control signal generated by the processing circuit 73. With such a control mechanism, the light emitted by the light source 1 is concentrated on a desired track of the optical recording medium 5. Furthermore, the processing circuit 73 reproduces information recorded on the optical recording medium 5 based on a signal output from the second optical detector 7.

Thus, the optical recording/reproduction apparatus 70 including the optical head 11 of embodiment 1 can perform recording/reproduction of a signal on a high-density optical recording medium. Furthermore, since the optical head 11 has a superior temperature characteristic, an optical recording/reproduction apparatus which can produce stable control and reproduction signals can be realized with the optical head 11 of the present invention.

In the above example, an operation for reproducing an information signal recorded on the optical recording medium 5 has been described. However, even in an operation for recording an information signal on the optical recording medium 5, stable control can be performed similarly to the reproduction operation. Thus, an information signal with high reliability can be recorded on the optical recording medium 5.

In the above example, an optical head of embodiment 1 is employed. However, when employing an optical head of embodiment 2 which has a further improved control characteristic as compared with that of embodiment 1, it is natural that an optical recording/reproduction apparatus which realizes further improved control can be produced.

As described above, according to embodiment 4, an optical head which is suitable for mass production and which has a superior temperature characteristic is employed in an optical recording/reproduction apparatus, whereby the optical recording/reproduction apparatus can obtain a control characteristic such that the optical recording/reproduction apparatus can perform a stable operation and produce a stable reproduction signal even when variation of temperature, etc., occurs.

In embodiments 1 through 4, three lenses are used in two groups. However, according to the present invention, other lens arrangements may be employed.

In embodiments 1 through 4, an optical head of an infinite system is used. However, according to the present invention, an optical head of a finite system which does not include a collimator lens may be used.

In embodiments 1 through 4, a non-polarization optical system is used. However, according to the present invention, a polarization optical system may be used.

In embodiments 1 through 4, an optical recording medium on which information is recorded by light only has been described. However, according to the present invention, an objective lens assembly of the present invention, and an optical head and an optical recording/reproduction apparatus using such an objective lens assembly can also be applied to an optical recording medium which records information by using light and magnetism. Even in such a case, the same effects as those described above can be obtained.

In embodiments 1 through 4, the optical recording medium is an optical disc. However, the present invention can be applied to other optical information recording mediums which realize functions similar to those of the optical disc, such as an optical recording medium in the form of a card, etc.

Hereinbefore, embodiments of the present invention has been described with reference to several specific examples. However, the present invention is not limited to the above embodiments, but can be applied to any embodiment so long as it falls within the technological concept of the present invention.

As described above, according to the present invention, it is possible to provide an objective lens assembly where aberration of each component lens which may be caused due to variations in the production thereof can be corrected by a method suitable for mass production of the objective lens assembly. Furthermore, it is possible to provide an optical head and an optical recording/reproduction apparatus using such an objective lens assembly.

Furthermore, according to the present invention, it is possible to provide an objective lens assembly having a superior temperature characteristic, and an optical head and an optical recording/reproduction apparatus using such an objective lens assembly.

Further still, according to the present invention, it is possible to provide an objective lens assembly where aberration of each component lens which may be caused due to variations in the production thereof can be corrected with high accuracy, and an optical head and an optical recording/reproduction apparatus using such an objective lens assembly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An objective lens assembly, comprising:
at least two groups of lenses having a common optical axis; and
at least two lens holders for respectively holding the at least two groups of lenses,
wherein each of the lens holders has an end face perpendicular to the optical axis, and
the lens holders are positioned such that the end face of one of the lens holders faces the end face of the other lens holder, and a gap between these end faces is filled with an adhesive agent for adhering the lens holders to each other.

2. An objective lens assembly according to claim 1, wherein a numerical aperture (NA) of the objective lens assembly is 0.7 or more.

3. An objective lens assembly according to claim 2, wherein chromatic aberration of the objective lens assembly for light having a wavelength from 390 nm to 450 nm is corrected.

4. An objective lens assembly according to claim 1, wherein one of the at least two lens holders is adjusted with respect to at least another one of the at least two lens holders along at least five directions including a direction parallel to the optical axis, two directions perpendicular to the optical axis, and two tilt directions, and thereafter is adhered by the adhesive agent to the at least another one of the at least two lens holders.

5. An objective lens assembly according to claim 1, wherein one of the at least two lens holders is adjusted with respect to at least another one of the at least two lens holders along at least five directions including a direction parallel to the optical axis, two directions perpendicular to the optical axis, and two tilt directions, such that aberration of the objective lens assembly is equal to or smaller than a predetermined value.

6. An objective lens assembly according to claim 5, wherein the predetermined value of the aberration of the objective lens assembly is about 70 m$\lambda$.

7. An objective lens assembly according to claim 1, wherein a shape of at least one of the at least two lens holders is different from those of the other lens holders of the at least two lens holders.

8. An objective lens assembly according to claim 1, wherein all of the at least two lens holders have the same shape.

9. An objective lens assembly according to claim 1, wherein the at least two lens holders are all formed of the same material.

10. An objective lens assembly according to claim 1, wherein a material used for forming at least one of the at least two lens holders is different from that used for forming the other lens holders of the at least two lens holders.

11. An objective lens assembly according to claim 1, wherein at least one of the at least two lens holders has a mirror face at a position opposite to the end face thereof.

12. An objective lens assembly according to claim 11, wherein the mirror face is formed by plating or vapor deposition.

13. An objective lens assembly according to claim 1, wherein at least one of the at least two lens holders has an aperture formed therein for determining a size of the numerical aperture (NA) of the objective lens assembly.

14. An objective lens assembly according to claim 1, wherein the lens holder is blackened or made of a transparent material such that reflectance inside the lens holder is reduced.

15. An objective lens assembly according to claim 1, wherein a group of lenses among the at least two groups of lenses are contained inside the lens holder for holding the group of lenses.

16. An objective lens assembly according to claim 1, wherein at least one group of the at least two groups of lenses partially protrudes from at least one of the at least two lens holders for holding the at least two groups of lenses.

17. An objective lens assembly according to claim 1, wherein a material for forming the at least two lens holders is a metal.

18. An objective lens assembly according to claim 1, wherein a material for forming the at least two lens holders is a resin.

19. An objective lens assembly according to claim 18, wherein the thermal expansion coefficient of the resin is isotropic.

20. An objective lens assembly according to claim 1, wherein at least one group among the at least two groups of lenses and at least one of the at least two lens holders for holding the one group among the at least two groups of lenses are integrally formed.

21. An apparatus for assembling/adjusting an objective lens assembly of claim 5, comprising:
a light source for emitting light toward the objective lens assembly;
a diffraction grating for generating interference fringes based on the light transmitted through the objective lens assembly;
an aberration calculation section for calculating aberration of the objective lens assembly based on the interference fringes; and
a driving section for driving one of the at least two lens holders to move with respect to another one of the lens holders along at least five directions including a direction parallel to the optical axis, two directions perpendicular to the optical axis, and two tilt directions, such that the aberration of the objective lens assembly which is calculated by the aberration calculation section is equal to or smaller than the predetermined value.

22. An apparatus for assembling/adjusting an objective lens assembly according to claim 21, wherein:
the diffraction grating is formed on a glass substrate; and
the thickness of the glass substrate is determined such that the glass substrate has an aberration equal to that of an optical recording medium on which an optical recording/reproduction apparatus incorporating a completed objective lens assembly performs recording and/or reproduction.

23. An apparatus for assembling/adjusting an objective lens assembly according to claim 21, wherein:
the diffraction grating separates the light transmitted through the objective lens assembly into +1st-order diffraction light, −1st-order diffraction light, and transmitted light; and
the apparatus for assembling/adjusting an objective lens assembly further includes a numerical aperture management section for managing the size of aperture for determining the size of a numerical aperture of the objective lens assembly based on a positional relationship between a first overlapping area of the +1st-order diffraction light and the transmitted light and a second overlapping area of the −1st-order diffraction light and the transmitted light.

24. An optical head for recording or reproducing a signal on an optical recording medium, comprising:
a light source; and
the objective lens assembly of claim 1 located between the light source and the optical recording medium.

25. An optical head according to claim 24, further comprising an actuator which includes a movable member coupled to the optical lens assembly, a movable member holding section for holding the movable member, and a movable member driving section coupled to the movable member holding section for driving the movable member,
wherein the movable member included in the actuator and the at least two lens holders are formed of the same material.

26. An optical head according to claim 24, further comprising an actuator which includes a movable member coupled to the optical lens assembly, a movable member holding section for holding the movable member, and a movable member driving section coupled to the movable member holding section for driving the movable member,
wherein the movable member included in the actuator functions as at least one of the at least two lens holders.

27. An optical recording/reproduction apparatus for recording or reproducing a signal on an optical recording medium, comprising:
a motor for rotating the optical recording medium;
the optical head of claim 24; and
a processing circuit for controlling the motor and the optical head.

28. An objective lens assembly, comprising:
at least two groups of lenses having a common optical axis; and
at least two lens holders for respectively holding the at least two groups of lenses,
wherein at least one of the at least two lens holders has an engagement portion for engaging with an actuator which drives the objective lens assembly such that the position of the objective lens assembly is controlled.

29. An, objective lens assembly according to claim 28, wherein:
each of the lens holders has an end face perpendicular to the optical axis; and
the lens holders are positioned such that the end face of one of the lens holders faces the end face of another lens holder, and a gap between these end faces is filled with an adhesive agent for adhering the lens holders to each other.

30. An objective lens assembly according to claim 28, wherein the engagement portion is provided at a position corresponding to a plane which includes the centroid of the objective lens assembly and is vertical to the optical axis.

31. An optical head for recording or reproducing a signal on an optical recording medium, comprising:

a light source; and the objective lens assembly of claim 28 located between the light source and the optical recording medium.

32. An optical head according to claim 31, further comprising an actuator which includes a movable member coupled to the optical lens assembly, a movable member holding section for holding the movable member, and a movable member driving section coupled to the movable member holding section for driving the movable member, wherein the engagement portion of one of the at least two lens holders engages with the movable member included in the actuator.

33. An optical head according to claim 32, wherein the engagement portion is provided such that the centroid of the objective lens assembly coincides with a center of driving of the actuator.

34. An optical recording/reproduction apparatus for recording or reproducing a signal on an optical recording medium, comprising:

a motor for rotating the optical recording medium;

the optical head of claim 30, and a processing circuit for controlling the motor and the optical head.

* * * * *